United States Patent
Kabzan et al.

(10) Patent No.: US 11,794,775 B2
(45) Date of Patent: Oct. 24, 2023

(54) CONTROL ARCHITECTURES FOR AUTONOMOUS VEHICLES

(71) Applicant: MOTIONAL AD LLC, Boston, MA (US)

(72) Inventors: Juraj Kabzan, Singapore (SG); Hans Andersen, Singapore (SG); Lixun Lin, Singapore (SG); Ning Wu, Singapore (SG); Yiming Zhao, Allison Park, PA (US); Xiyuan Liu, Pittsburgh, PA (US); Qian Wang, Allison Park, PA (US); Zachary Batts, Pittsburgh, PA (US); Jesse Adam Miller, Cambridge, MA (US); Boaz Cornelis Floor, Singapore (SG); Marc Dominik Heim, Singapore (SG)

(73) Assignee: Motional AD LLC, Boston, MA (US)

( * ) Notice: Subject to any disclaimer, the term of this patent is extended or adjusted under 35 U.S.C. 154(b) by 66 days.

(21) Appl. No.: 17/249,465

(22) Filed: Mar. 2, 2021

(65) Prior Publication Data
US 2021/0276588 A1    Sep. 9, 2021

Related U.S. Application Data

(60) Provisional application No. 62/984,702, filed on Mar. 3, 2020.

(51) Int. Cl.
*B60W 60/00* (2020.01)
*G05D 1/00* (2006.01)
(Continued)

(52) U.S. Cl.
CPC .......... *B60W 60/001* (2020.02); *B60W 10/04* (2013.01); *B60W 10/20* (2013.01);
(Continued)

(58) Field of Classification Search
CPC .... B60W 60/001; B60W 10/04; B60W 10/20; B60W 2710/20; B60W 2720/10;
(Continued)

(56) References Cited

U.S. PATENT DOCUMENTS 9,008,890 B1 *  4/2015  Herbach ................ G07C 5/008
                                                         340/436
9,754,490 B2 *  9/2017  Kentley ............... G05D 1/0088
(Continued)

FOREIGN PATENT DOCUMENTS

EP         3750781        12/2020
JP      2009-184633 A      8/2009
WO    WO 2017/165286 A1    9/2017

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

(Continued)

*Primary Examiner* — Jonathan M Dager
*Assistant Examiner* — Jean W Charleston
(74) *Attorney, Agent, or Firm* — Knobbe Martens Olson & Bear LLP

(57) ABSTRACT

The subject matter described in this specification is generally directed control architectures for an autonomous vehicle. In one example, a reference trajectory, a set of lateral constraints, and a set of speed constraints are received using a control circuit. The control circuit determines a set of steering commands based at least in part on the reference trajectory and the set of lateral constraints and a set of speed commands based at least in part on the set of speed con- (Continued)

straints. The vehicle is navigated, using the control circuit, according to the set of steering commands and the set of speed commands.

18 Claims, 30 Drawing Sheets

(51) Int. Cl.
    *G05D 1/02*         (2020.01)
    *B60W 10/04*       (2006.01)
    *B60W 10/20*       (2006.01)

(52) U.S. Cl.
    CPC ......... *G05D 1/0088* (2013.01); *G05D 1/0223* (2013.01); *B60W 2710/20* (2013.01); *B60W 2720/10* (2013.01); *B60W 2720/12* (2013.01); *G05D 2201/0213* (2013.01)

(58) Field of Classification Search
    CPC ......... B60W 2720/12; B60W 60/0011; B60W 30/09; B60W 2050/0033; B60W 2556/10; B60W 2556/45; B60W 2720/103; B60W 2754/20; B60W 2754/30; B60W 60/00; B60W 30/143; B60W 40/10; B60W 30/10; B60W 40/072; B60W 40/105; B60W 2050/0002; B60W 2300/36; B60W 2520/10; G05D 1/0088; G05D 1/0223; G05D 2201/0213; G05D 1/0236; G05D 1/0214; G05D 1/024; G05D 1/0242; G05D 1/0251; G05D 1/0255; G05D 1/0257; G05D 1/0263; G05D 1/0278; G05D 1/028; G05D 1/0285; G05D 2201/0211; G05D 1/00; G05D 1/0212; B60Y 2200/13; B60Y 2300/10

USPC .......................................................... 701/25
See application file for complete search history.

(56) References Cited

U.S. PATENT DOCUMENTS

| | | | |
|---|---|---|---|
| 9,873,427 B2* | 1/2018 | Danzl | B60W 10/18 |
| 10,671,076 B1 | 6/2020 | Kobilarov et al. | |
| 10,737,717 B2 | 8/2020 | Peng et al. | |
| 10,852,746 B2* | 12/2020 | Silver | B60W 30/18172 |
| 10,943,273 B2* | 3/2021 | Hoffberg | G07F 17/323 |
| 11,345,355 B2* | 5/2022 | Leon Ojeda | G05D 1/0088 |
| 2018/0330173 A1* | 11/2018 | Zhu | B60W 10/184 |
| 2019/0286151 A1 | 9/2019 | Palanisamy et al. | |
| 2019/0346851 A1 | 11/2019 | Liu et al. | |
| 2019/0361456 A1 | 11/2019 | Zeng et al. | |
| 2020/0026276 A1 | 1/2020 | Zhang et al. | |
| 2020/0156639 A1 | 5/2020 | Liu et al. | |
| 2020/0348684 A1* | 11/2020 | Zhang | G05D 1/0223 |
| 2020/0353949 A1* | 11/2020 | Huang | G01C 21/3691 |
| 2021/0323579 A1 | 10/2021 | Kim | |
| 2021/0403042 A1 | 12/2021 | Jaegal | |
| 2022/0017118 A1 | 1/2022 | Shinomoto et al. | |

OTHER PUBLICATIONS

Great Britain Office Action Issued for Application No. GB 2102934.3, dated Nov. 18, 2021.
Great Britain Office Action issued for Application No. GB 2102934.3, dated May 31, 2022.
Korean Office Action issued for Application No. KR 10-2021-0028023, dated Oct. 25, 2022.
Korean Notice of Allowance issued for Application No. KR 10-2021-0028023, dated Jul. 20, 2023.
Great Britain Office Action issued for Application No. GB 2216101.2, dated Mar. 8, 2023.

* cited by examiner

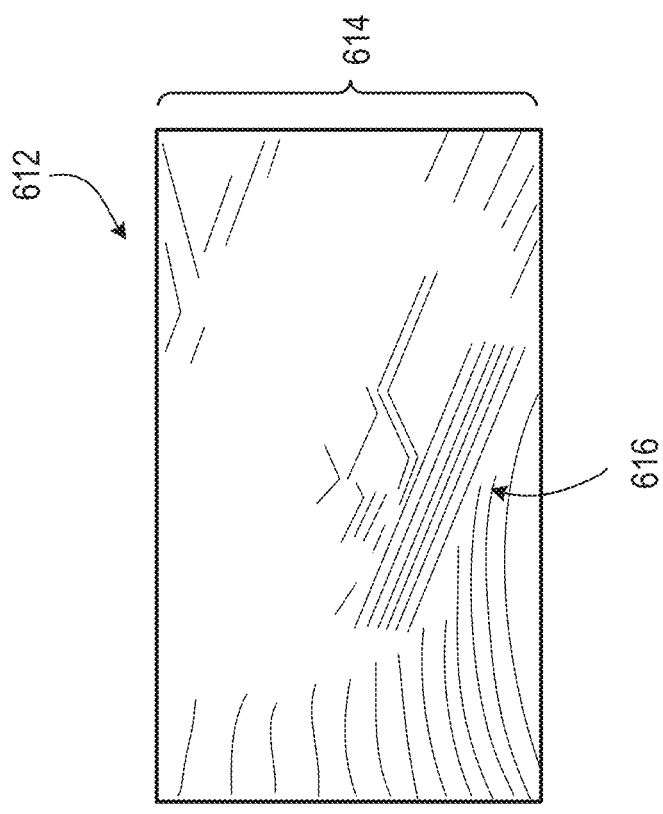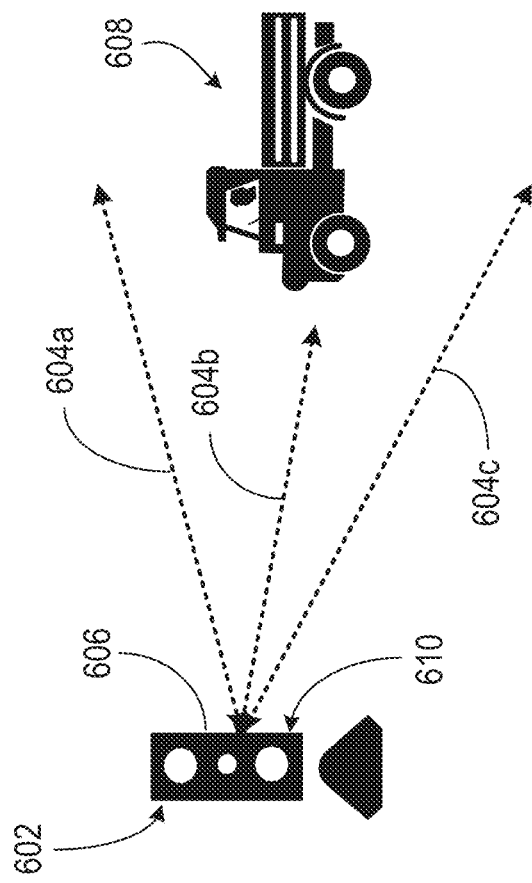
FIG. 6

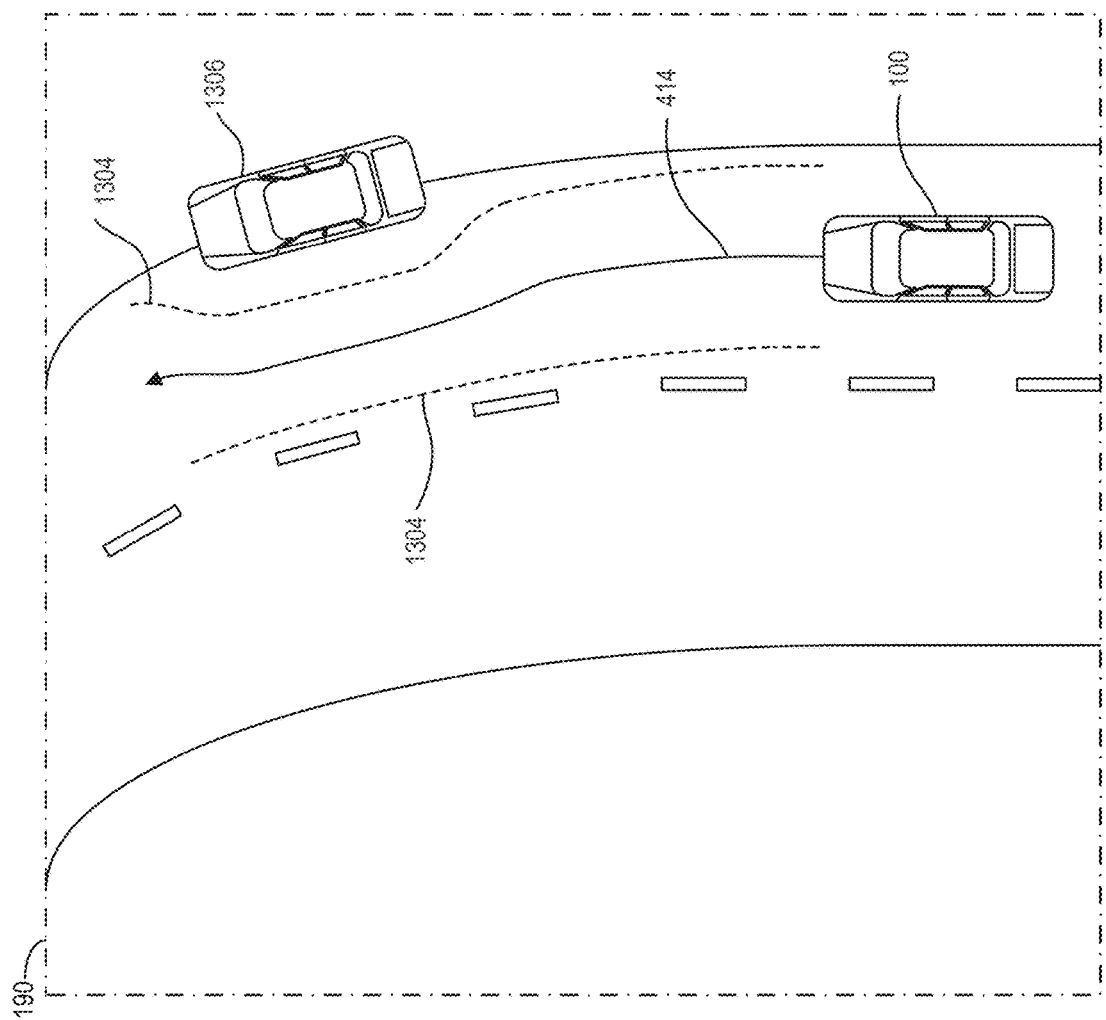

CONTROL ARCHITECTURES FOR AUTONOMOUS VEHICLES

CROSS-REFERENCE TO RELATED APPLICATIONS

This application claims the benefit of U.S. Provisional Patent Application No. 62/984,702, filed Mar. 3, 2020, entitled "CONTROL ARCHITECTURES FOR AUTONOMOUS VEHICLES," the entire contents of which are hereby incorporated by reference.

FIELD

This description relates to control architectures for autonomous vehicles.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to systems and techniques for controlling an autonomous vehicle. Generally, the systems are configured to receive one or more constraints on the vehicle's speed and/or position, determine steering and speed commands based on the constraints, and navigate the vehicle using the steering and speed commands.

In particular, an example technique includes: while a vehicle is operating in an autonomous mode: receiving, using a control circuit, a reference trajectory, a set of lateral constraints, and a set of speed constraints; determining, using the control circuit, a set of steering commands based at least in part on the reference trajectory and the set of lateral constraints; determining, using the control circuit, a set of speed commands based at least in part on the set of speed constraints, wherein the set of speed commands are determined independently from the set of steering commands; and navigating, using the control circuit, the vehicle according to the set of steering commands and the set of speed commands.

Another example technique includes: while a vehicle is operating in an autonomous mode: receiving, using a control circuit, a reference trajectory, a set of lateral constraints, and a set of speed constraints; determining, using the control circuit, a predicted path for the vehicle and a speed profile for the predicted path, wherein the predicted path and speed profile are based on the reference trajectory, the set of lateral constraints, and the set of speed constraints; determining, using the control circuit, a reference point of the vehicle along the predicted path and a speed command associated with the reference point based at least in part of the predicted path and the speed profile; determining, using the control circuit, a steering command based at least in part on the reference point of the vehicle; and navigating, using the control circuit, the vehicle according to the steering command and the speed command.

Another example technique includes: while a vehicle is operating in an autonomous mode: receiving, using a control circuit, a reference, a set of lateral constraints, and a set of speed constraints; determining, using the control circuit, a curvature of the reference trajectory; determining, using the control circuit, a set of steering commands and a set of speed commands based on the curvature of the reference trajectory, the set of lateral constraints, and the set of speed constraints; and navigating, using the control circuit, the vehicle according to the set of steering commands and the set of speed commands.

Another example technique includes: determining, using a control circuit, a control scenario; in accordance with a determination that the control scenario meets a first set of conditions: selecting, using the control circuit, a first group of control components; determining, using the first group of control components in the control circuit, a first set of steering commands and a first set of speed commands; and navigating, using the control circuit, the vehicle according to the first set of steering commands and the first set of speed commands; in accordance with a determination that the control scenario meets a second set of conditions: selecting, using the control circuit, a second group of control components, wherein the second group of control components is different from the first group of control components; determining, using the second group of control components in the control circuit, a second set of steering commands and a second set of speed commands; and navigating, using the control circuit, the vehicle according to the second set of steering commands and the second set of speed commands; and in accordance with a determination that the control scenario meets a third set of conditions: selecting, using the control circuit, a third group of control components, wherein the third group of control components includes components from the first group of control components and components from the second group of control components; determining, using the third group of control components in the control circuit, a third set of steering commands and a third set of speed commands; and navigating, using the control circuit, the vehicle according to the third set of steering commands and the third set of speed commands.

Another example technique includes: while a vehicle is operating in an autonomous mode: receiving, using a control circuit, a set of rules, wherein the set of rules includes a first subset of rules; receiving, using the control circuit, classified object data; determining, using the control circuit, a reference trajectory based at least in part on the set of rules and the classified object data; selecting, using the control circuit, the first subset of rules from the set of rules; determining, using the control circuit, a set of steering commands and a set of speed commands based at least in part on the reference trajectory, the classified object data, and the selected first subset of rules; and navigating, using the control circuit, the vehicle according to the set of steering commands and the set of speed commands.

Another example technique includes: while a vehicle is operating in an autonomous mode: receiving, using a control circuit, state information corresponding to a current state of the vehicle; predicting, using the control circuit, a future state of the vehicle based on a movement model, wherein the movement model includes a dynamic model and a kinematic model; determining, using the control circuit, a set of steering commands and a set of speed commands based at least in part on the current state of the vehicle and the predicted future state of the vehicle; and navigating, using the control circuit, the vehicle according to the set of steering commands and the set of speed commands.

These and other aspects, features, and implementations can be expressed as methods, apparatuses, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 shows an example of a LiDAR system.

FIGS. 13A-13E illustrate examples of an autonomous vehicle navigating a roadway in an environment.

DETAILED DESCRIPTION

Figure 1:
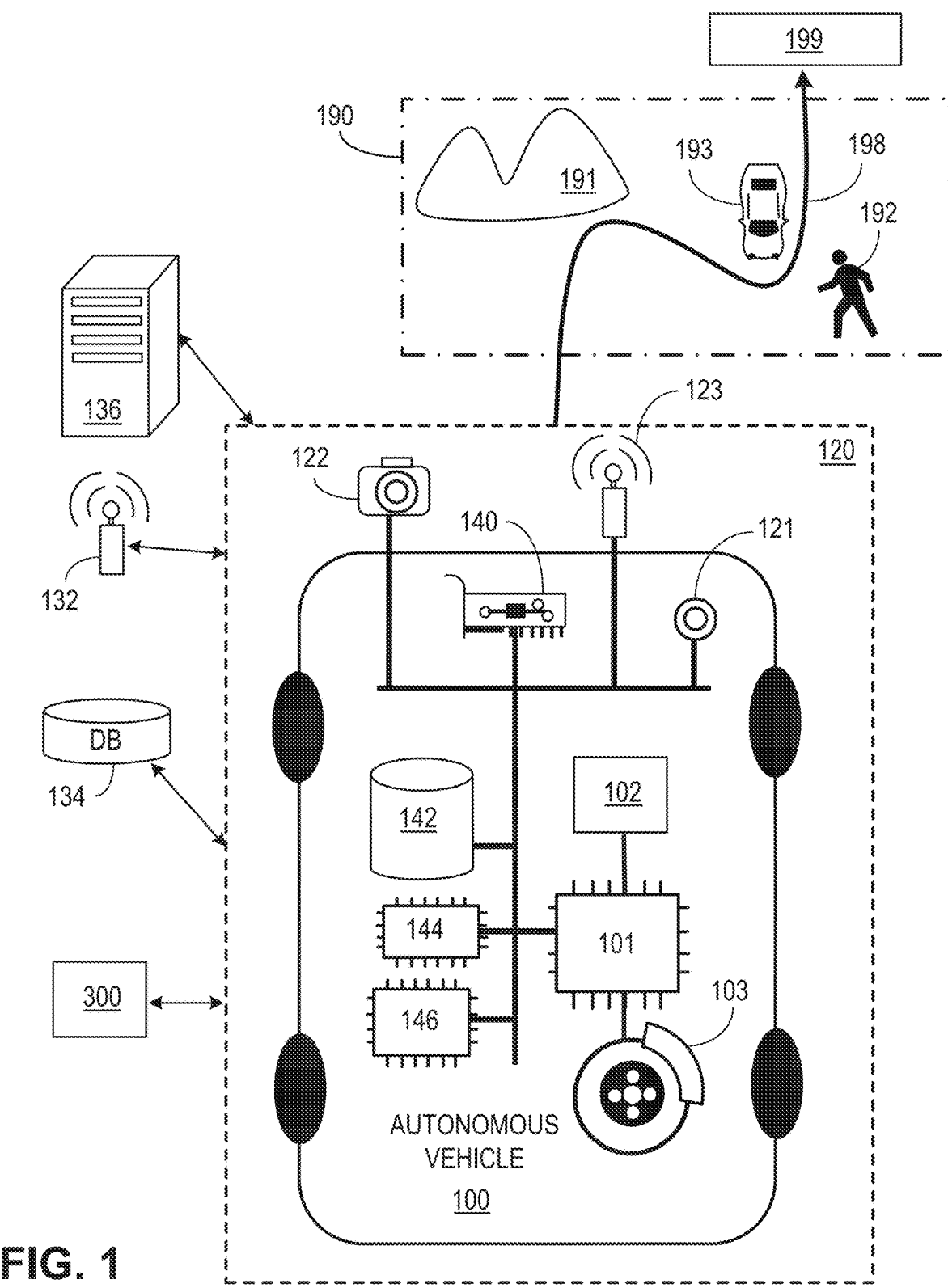
FIG. 1 shows an example of an autonomous vehicle having autonomous capability.

In the following description, for the purposes of explanation, numerous specific details are set forth in order to provide a thorough understanding of the present embodiments. It will be apparent, however, that the present embodiments may be practiced without these specific details. In other instances, well-known structures and devices are shown in block diagram form in order to avoid unnecessarily obscuring the present embodiments.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
    2. Hardware Overview
    3. Autonomous Vehicle Architecture
    4. Autonomous Vehicle Inputs
    5. Autonomous Vehicle Planning
    6. Autonomous Vehicle Control
    7. Computing System for Object Detection Using Pillars
    8. Example Point Clouds and Pillars
    9. Example Process for Detecting Objects and Operating the Vehicle Based on the Detection of the Objects General Overview Autonomous vehicles driving in complex environments (e.g., an urban environment) pose a great technological challenge. In order for autonomous vehicles to reach a destination in the environment, the vehicles determine a trajectory (sometimes referred to as a route) to the destination. Once the trajectory has been determined, specific steering and speed commands are determined which result in the vehicles traveling along the trajectory.

Systems and techniques are described herein for determining steering and speed commands for a trajectory using various control architectures. Once the steering and speed commands are determined, the commands are used to navigate autonomous vehicles.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
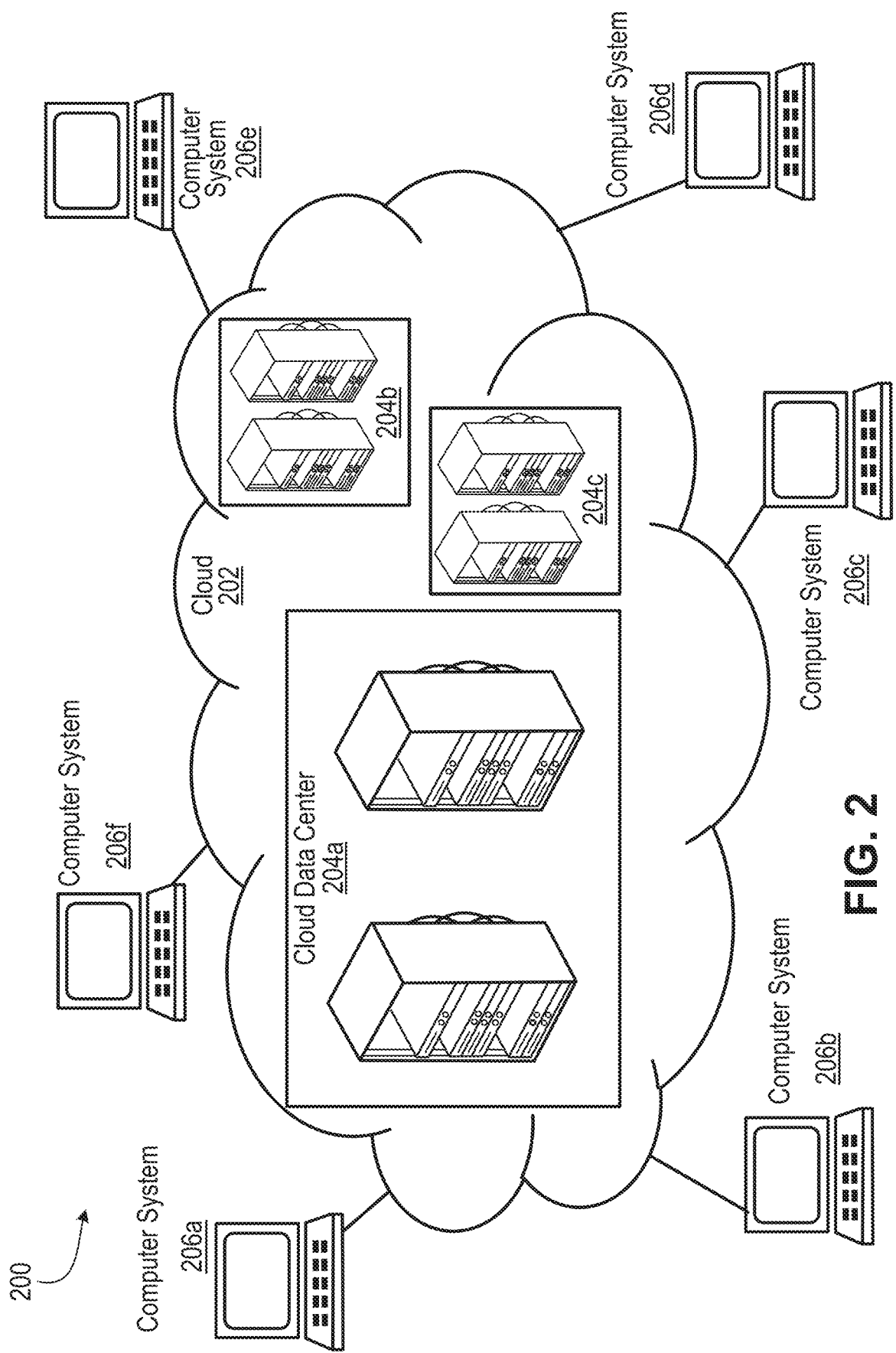
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
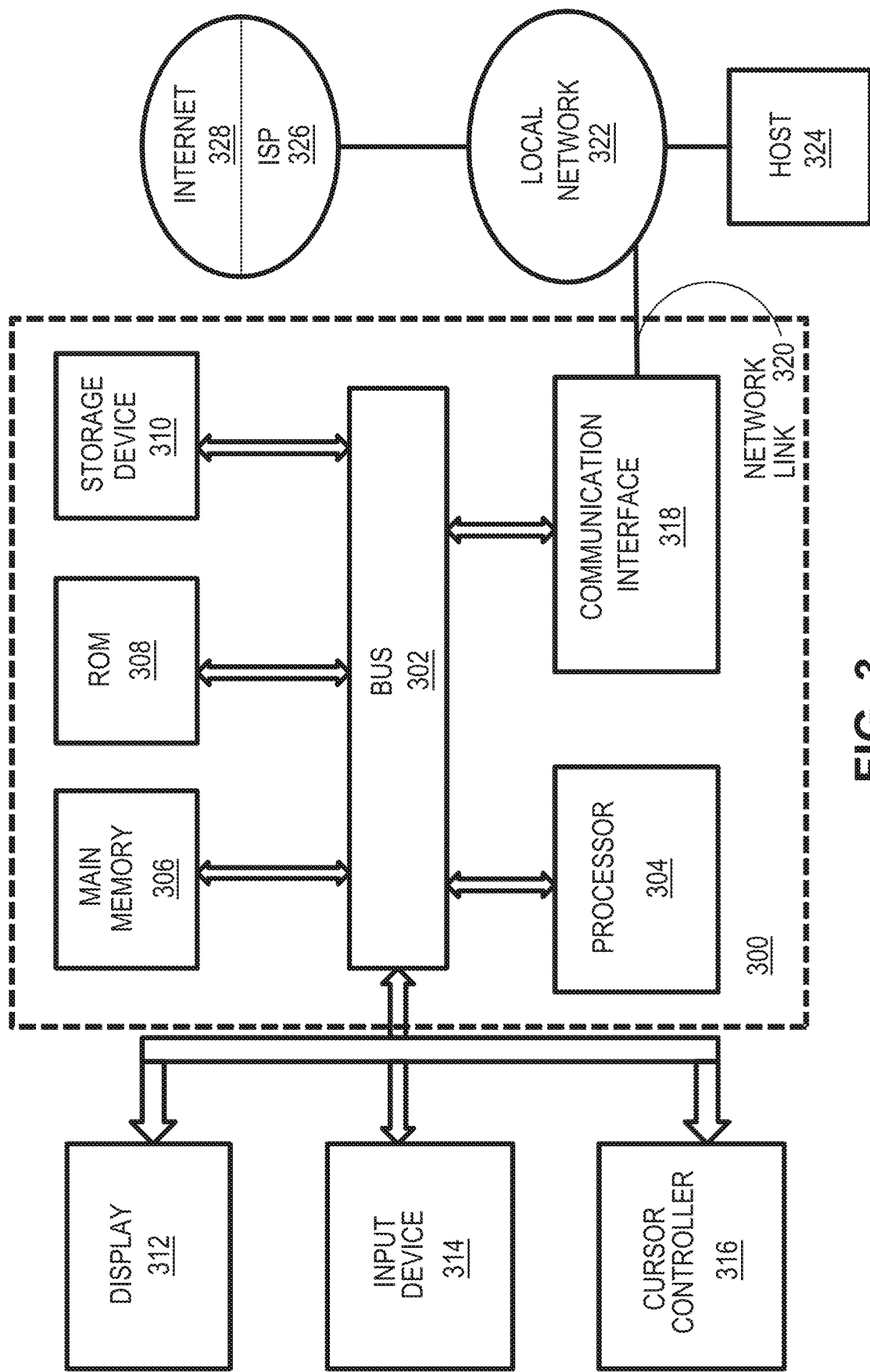
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
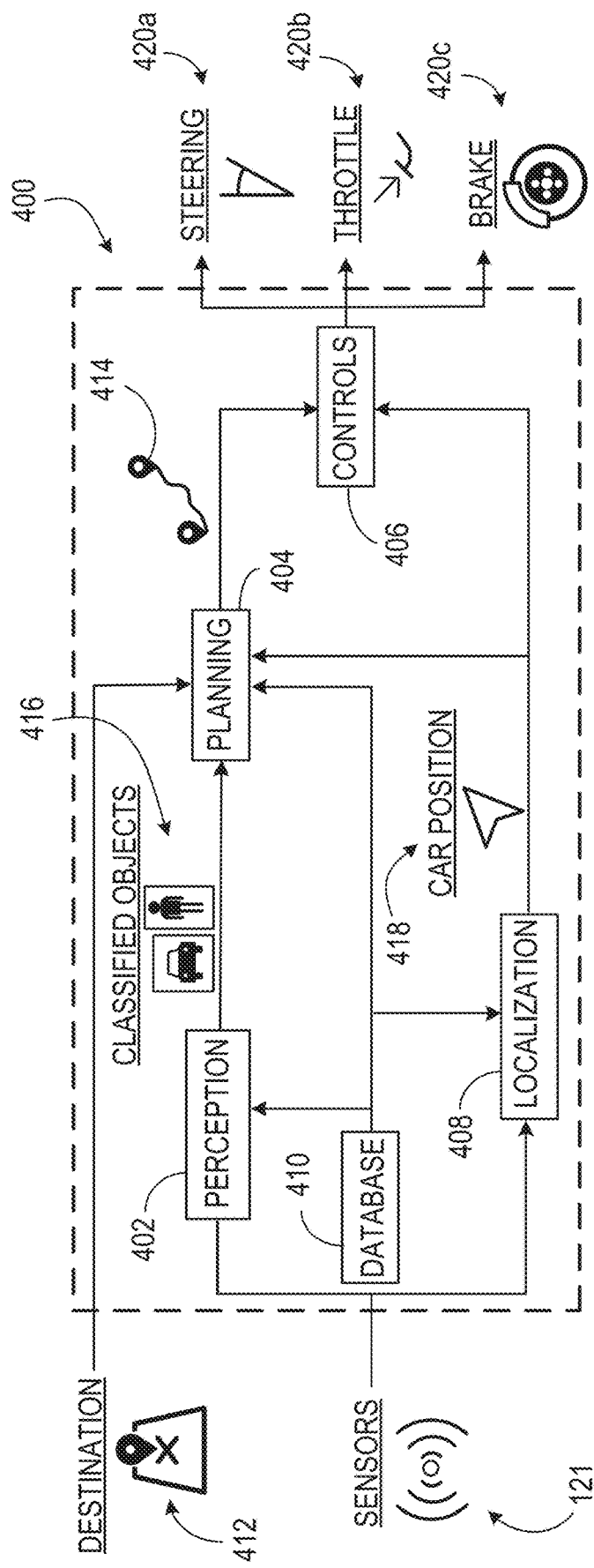
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a local-ization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
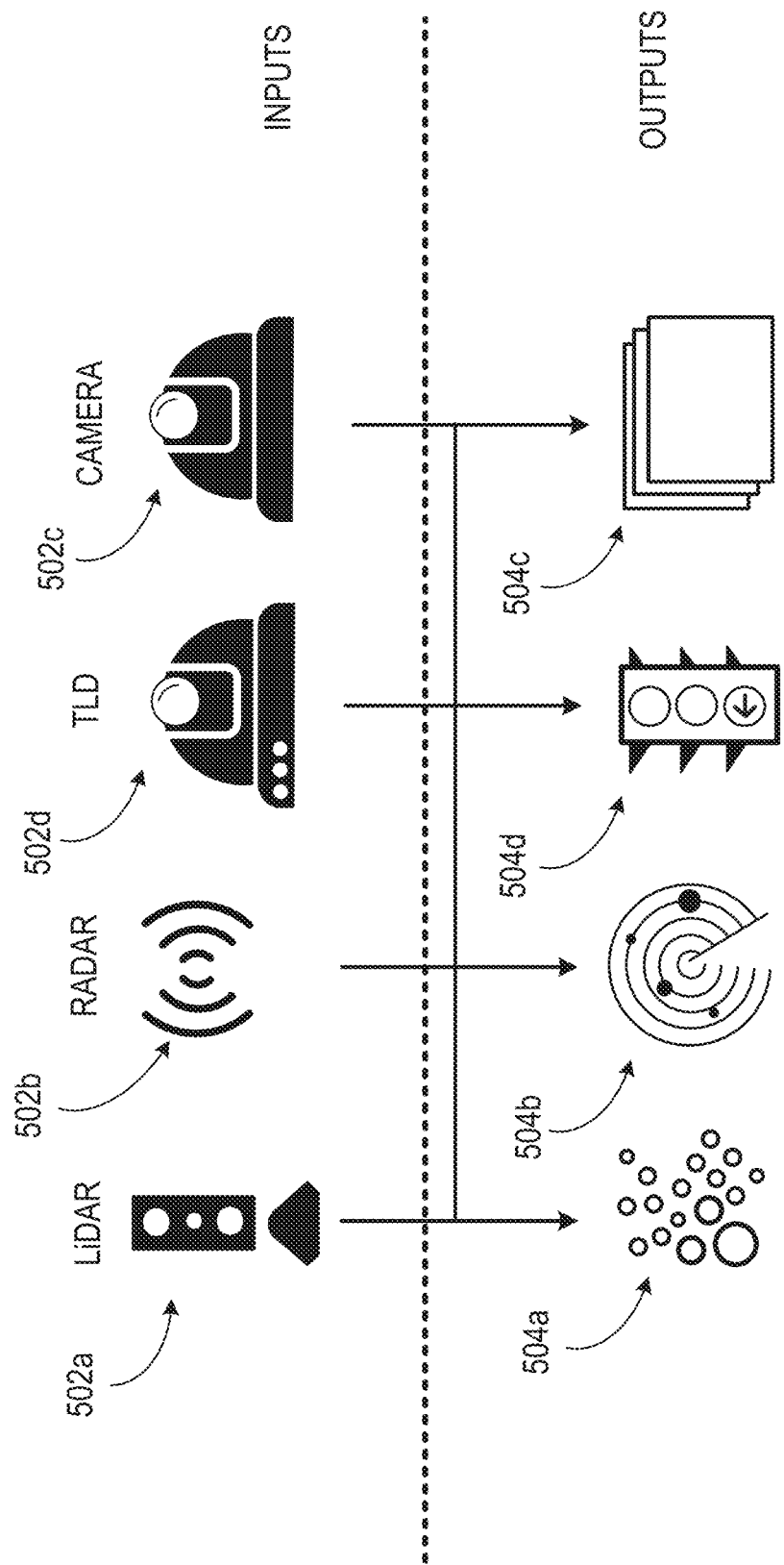
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
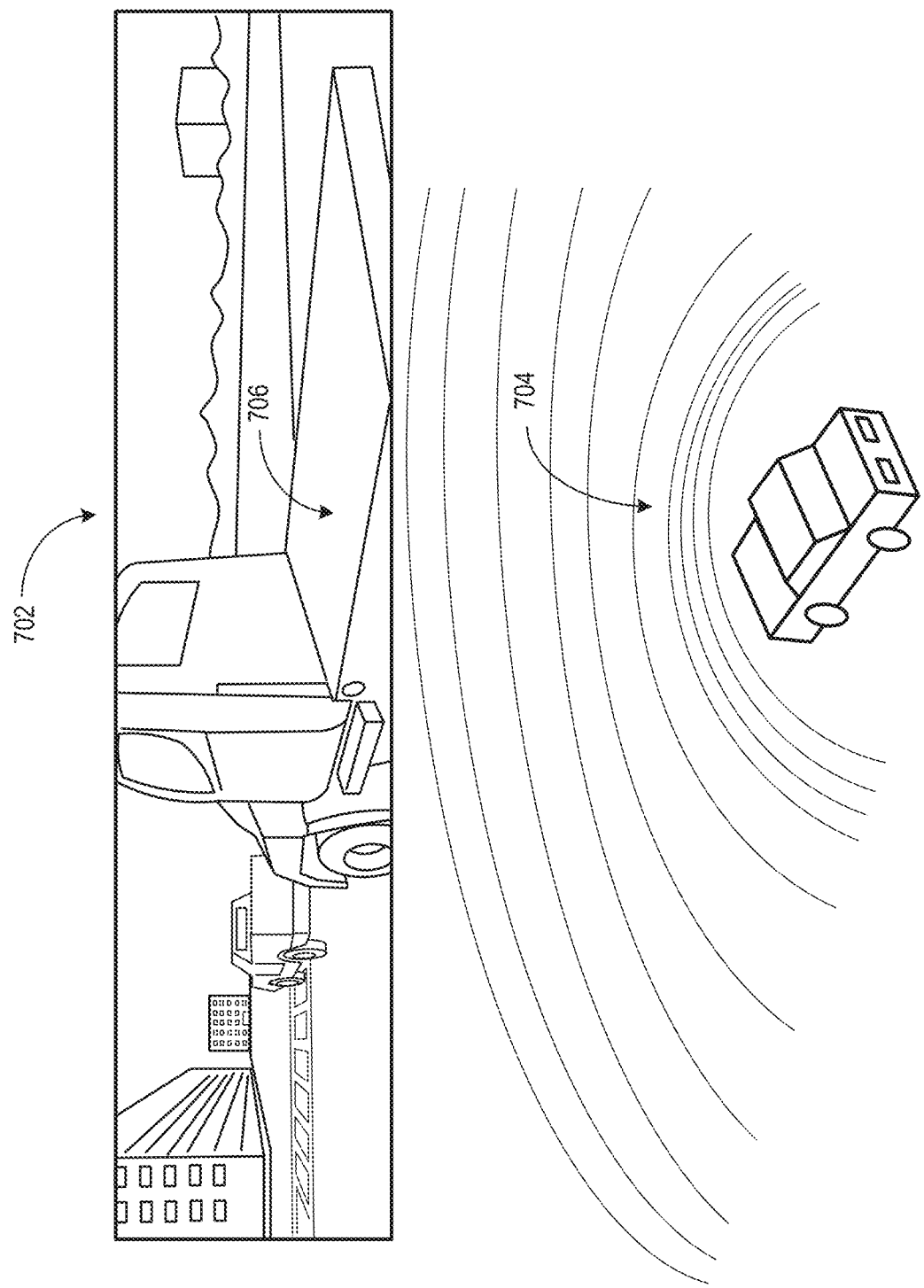
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
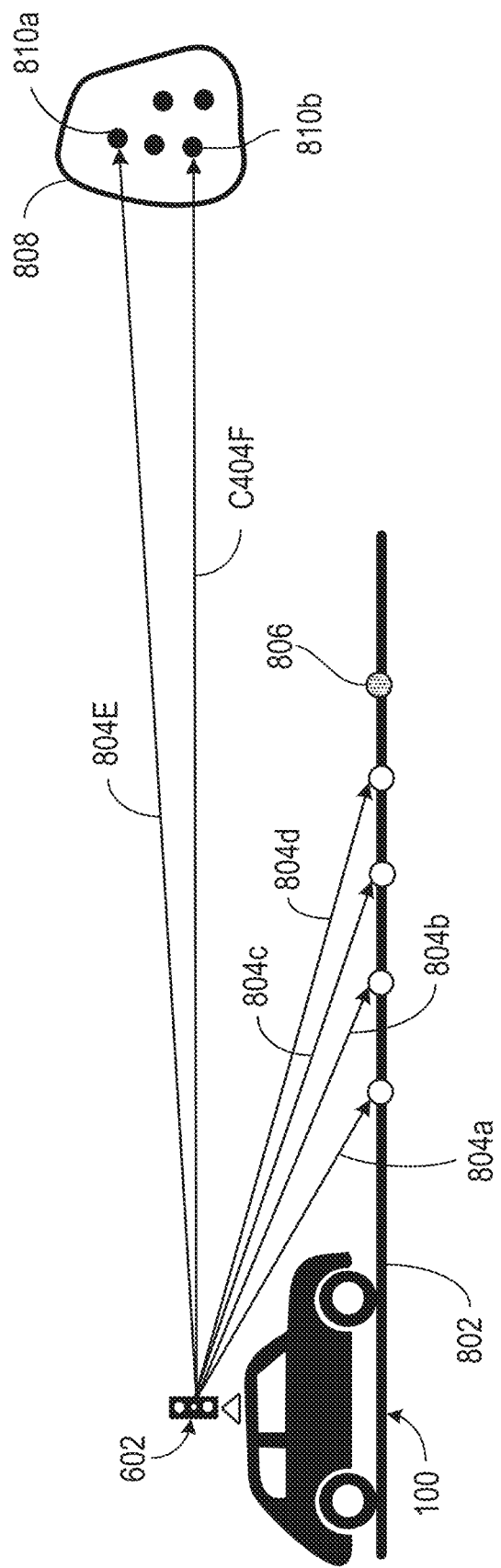
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
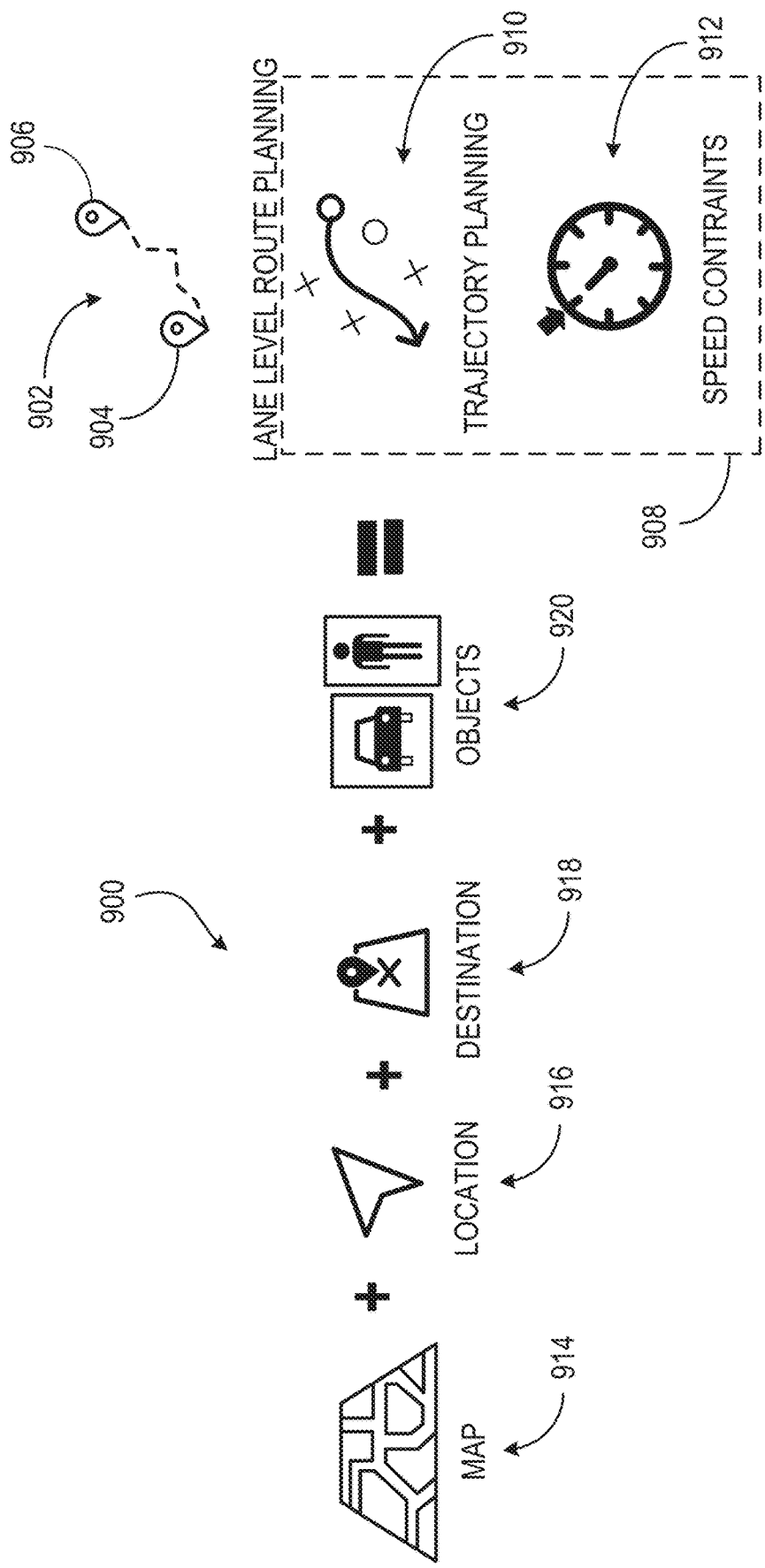
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
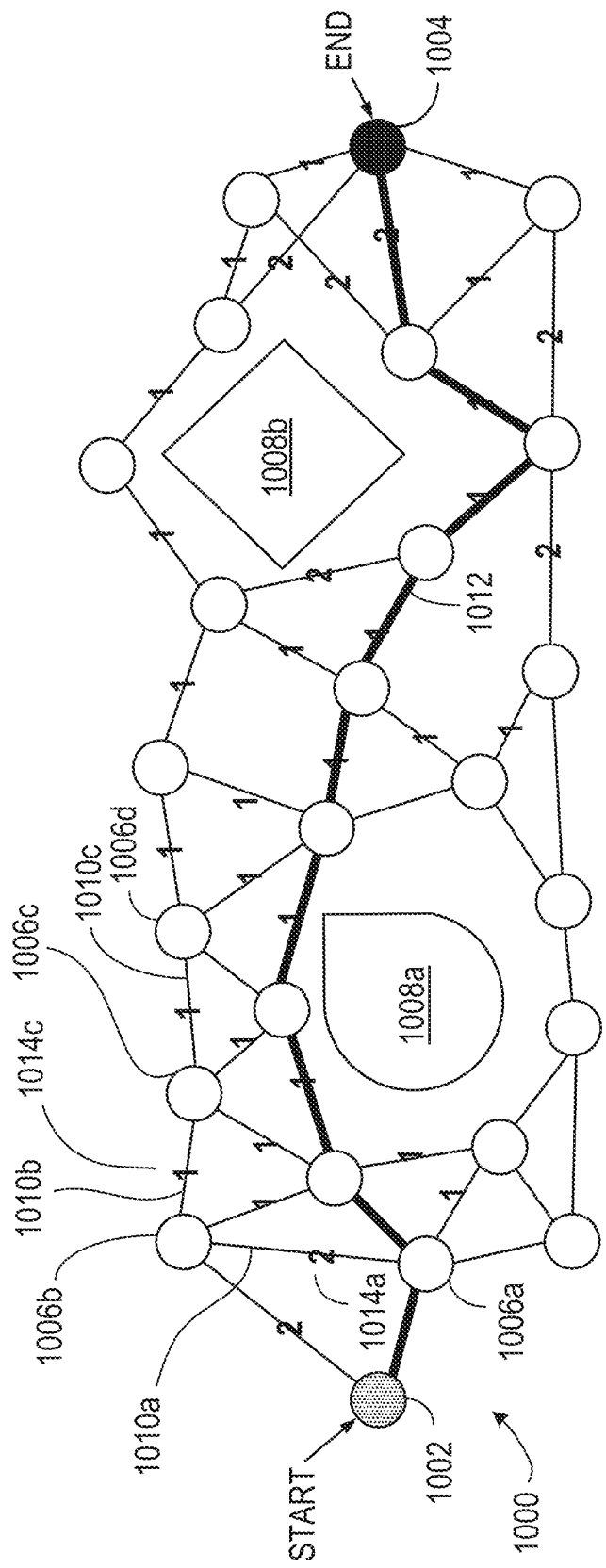
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
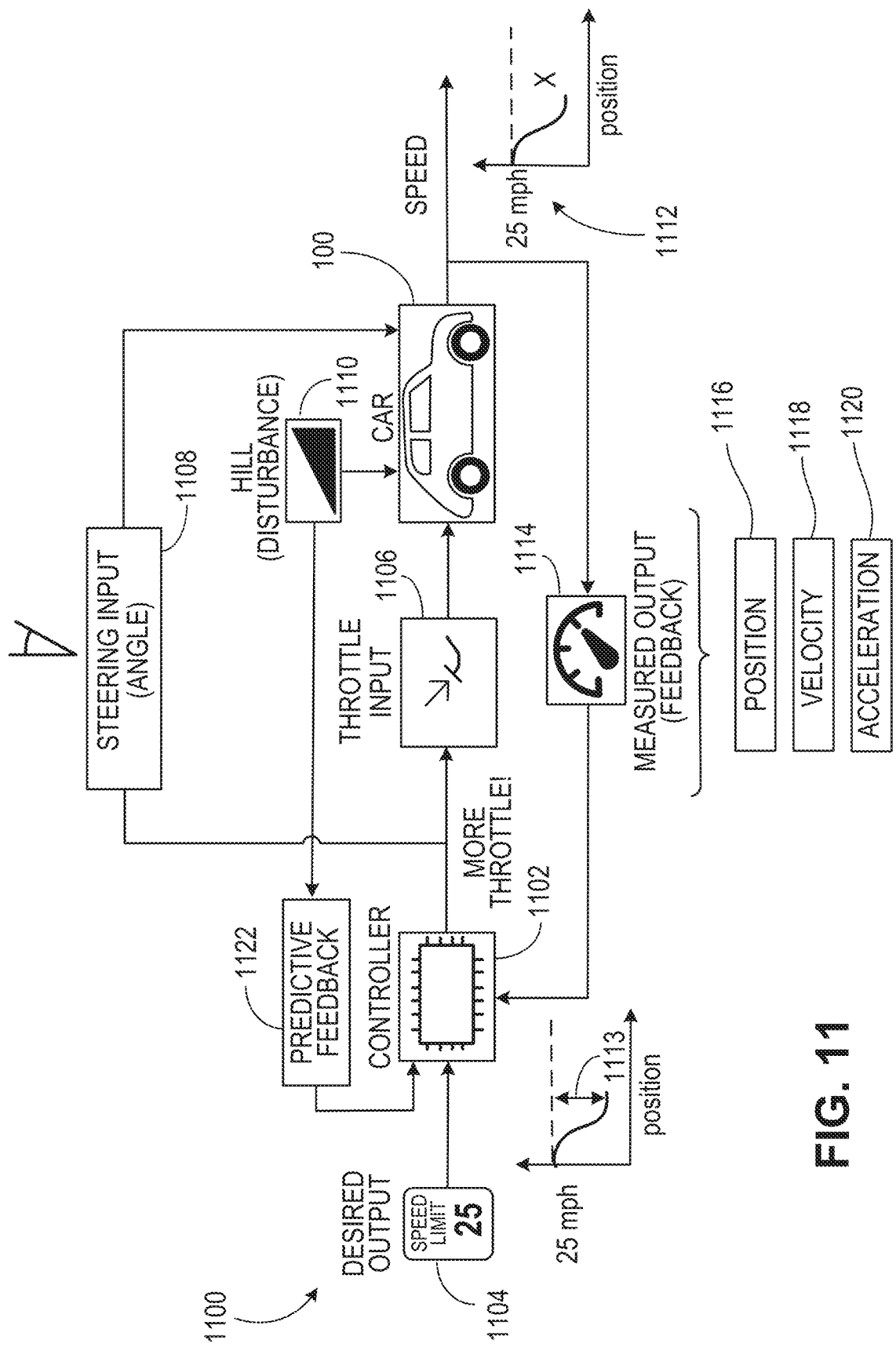
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 (also referred to as a speed command) and a steering input 1108 (also referred to as a steering command). The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
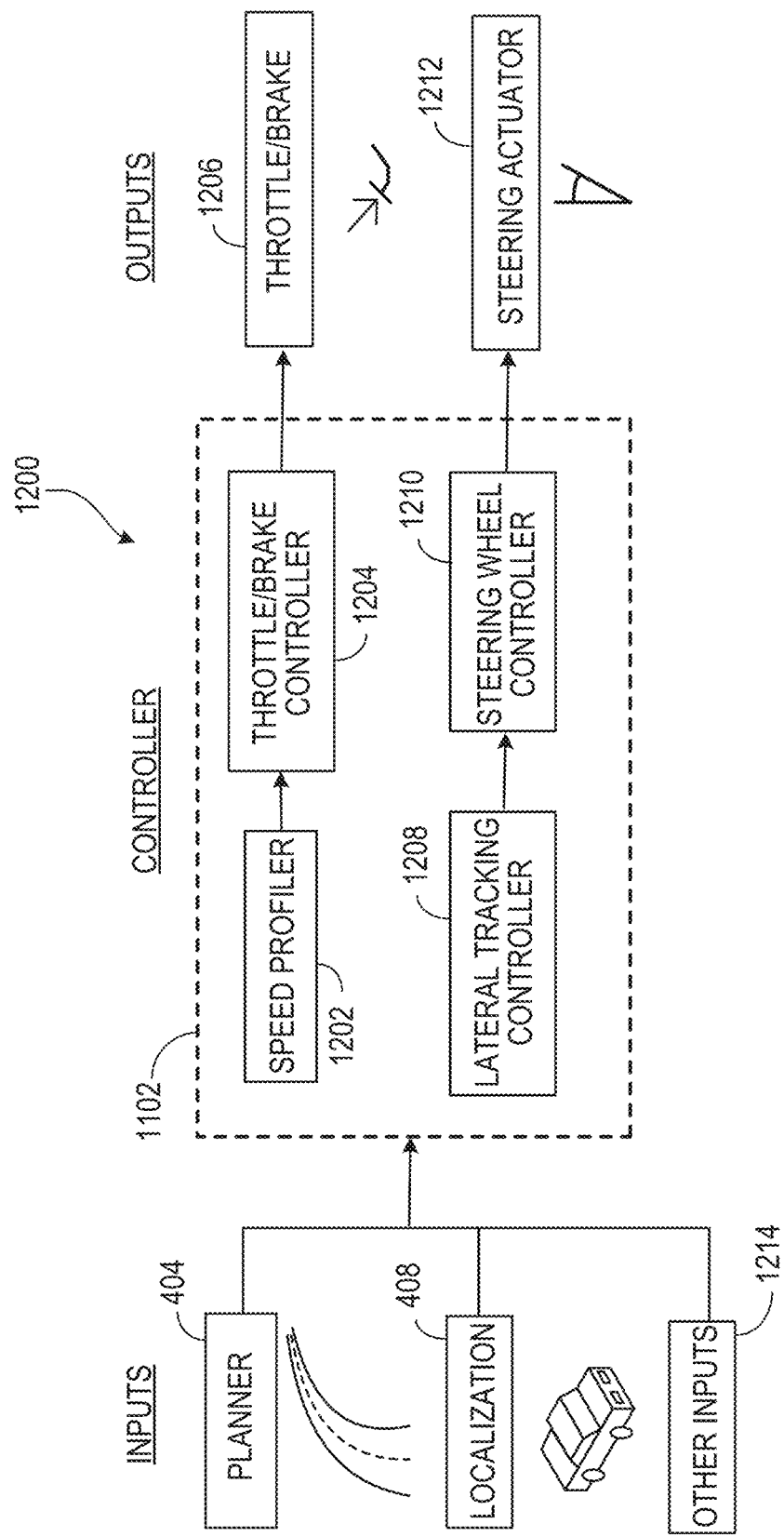
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Control Architectures for Autonomous Vehicle

Figure 13A:
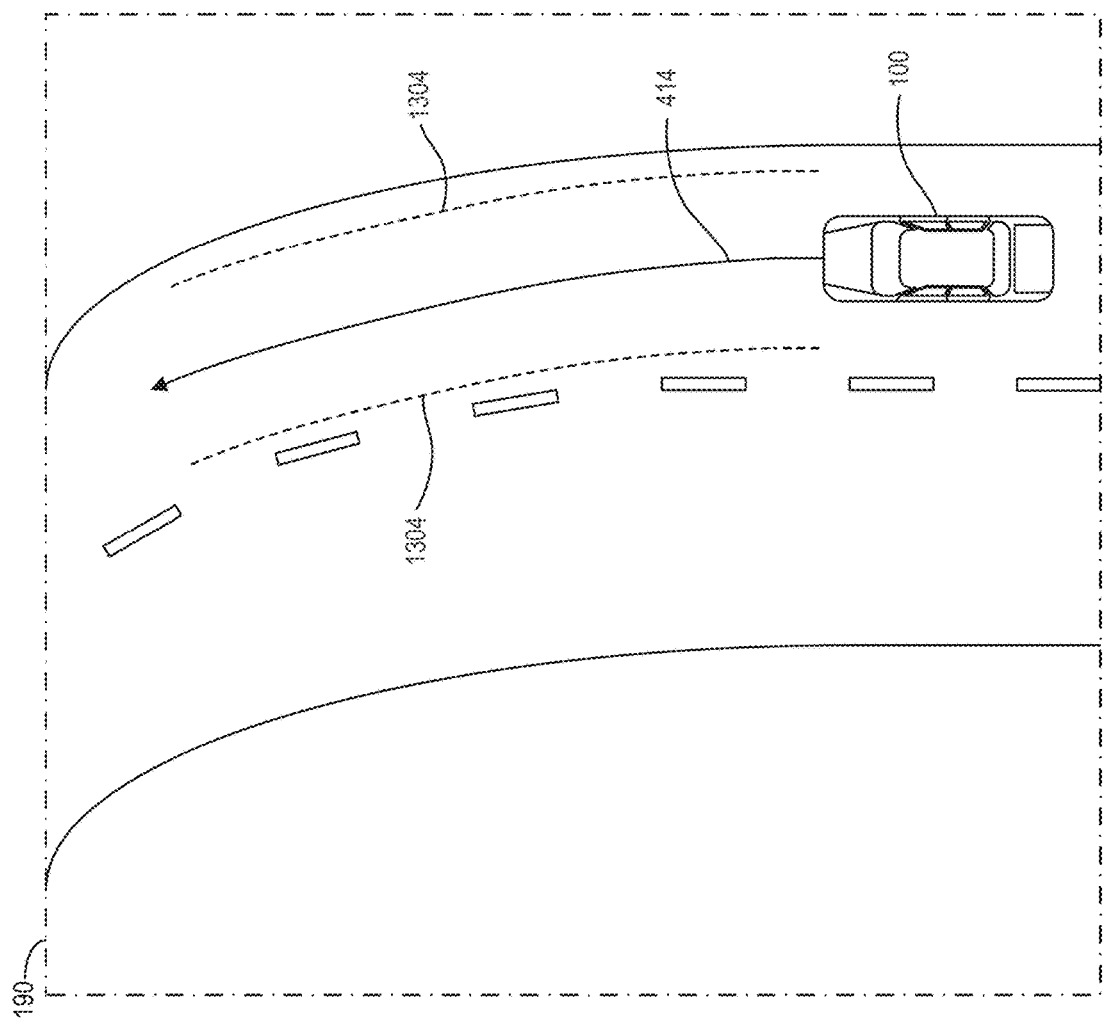
Figure 13B:
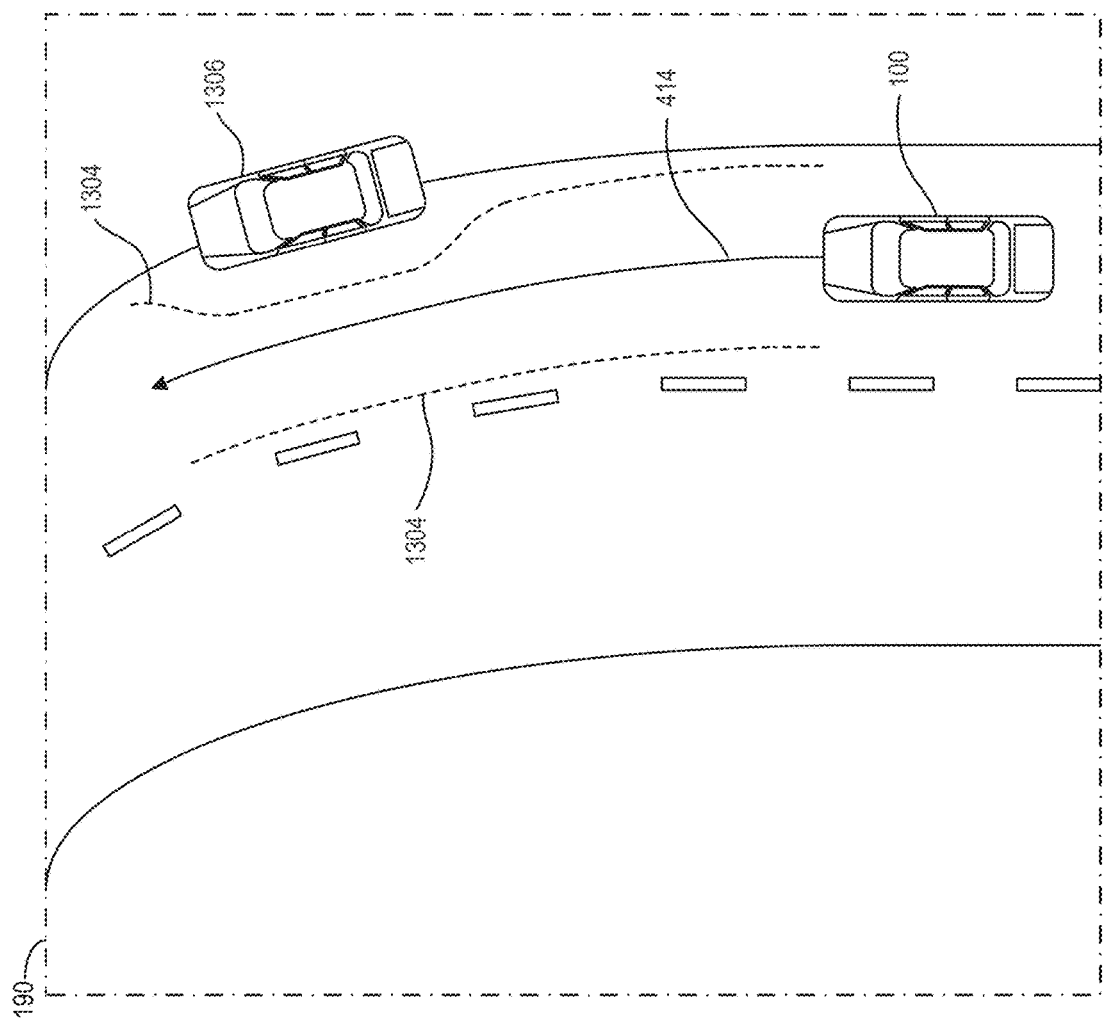

FIGS. 13A-13C illustrate examples of AV 100 navigating a roadway in environment 190. As shown in FIG. 13A, AV 100 navigates the roadway based in part on trajectory 414 and lateral constraints 1304. Trajectory 414 is determined by planning module 404 (as shown in FIG. 4). The planning module 404 uses destination information, map information, position information, sensor information, and/or other data to determine trajectory 414. In some embodiments, trajectory 414 is a general route AV 100 uses to navigate to reach a destination. For example, as shown in FIG. 13A, trajectory 414 specifies AV 100 is to proceed forward on the roadway, but without specifying precise steering or speed commands for AV 100 to execute in order to proceed forward (e.g., throttle input 1106 and steering input 1108). In some examples, trajectory 414 may specify AV 100 is to turn onto a different roadway, but without specifying precise steering or speed commands for AV 100 to execute in order to perform the turn.

Lateral constraints 1304 (also referred to as "tube" constraints) are determined based on map information, sensor information, and/or other data. Lateral constraints 1304 indicate the maximum distances to the left and right AV 100 can safely veer from trajectory 414 at different points in time as AV 100 travels along trajectory 414. For example, lateral constraints 1304 keep AV 100 within a safe travel lane of the roadway. If AV 100 deviates outside lateral constraints 1304, then AV 100 may enter a hazardous area outside of the travel lane. In some examples, lane markings on the roadway are used in determining lateral constraints 1304. In some examples, edges of the roadway are used in determining lateral constraints 1304. In some examples, obstacles near or on the roadway are used in determining lateral constraints 1304. Lane markings, edges of the roadway, and obstacles near or on the roadway can be detected by one or more sensors on AV 100.

Control module 406 (as shown in FIG. 4) uses the trajectory 414, lateral constraints 1304, and other information (such as speed constraints, AV position 418, and AV velocity) to determine control commands (also referred to as control functions 420a-c) (e.g., steering, throttling, braking) that will cause the AV 100 to travel along trajectory 414. Depending on the lateral constraints 1304, control module 406 may adjust trajectory 414 to keep AV 100 within the boundaries of the lateral constraints 1304.

FIG. 13B illustrates an example AV 100 navigating the roadway in environment 190 with an obstacle 1306 (e.g., another vehicle on the side of the road, a pedestrian, or other hazard). Due to the obstacle 1306, lateral constraints 1304 are adjusted. Lateral constraints 1304 are adjusted to keep AV 100 a safe distance (e.g., three feet) away from the obstacle 1306. If AV 100 were to continue along trajectory 414 as shown in FIG. 13B, then AV 100 may violate the lateral constraints 1304 and pass the obstacle at a distance less than the safe distance.

FIG. 13C illustrates an example AV 100 navigating the roadway in environment 190 with an adjusted trajectory 414. The adjusted trajectory 414 keeps AV 100 within the adjusted lateral constraints 1304 and allows AV 100 to pass the obstacle 1306 with at least a safe distance between AV 100 and obstacle 1306 (e.g., three feet or more). In order to travel along the adjusted trajectory 414, control module 404 determines steering and speed commands (e.g., throttle input 1106 and steering input 1108) based on the adjusted lateral constraints 1304 and other information (such as speed constraints, AV position 418, and AV velocity).

Figure 13D:
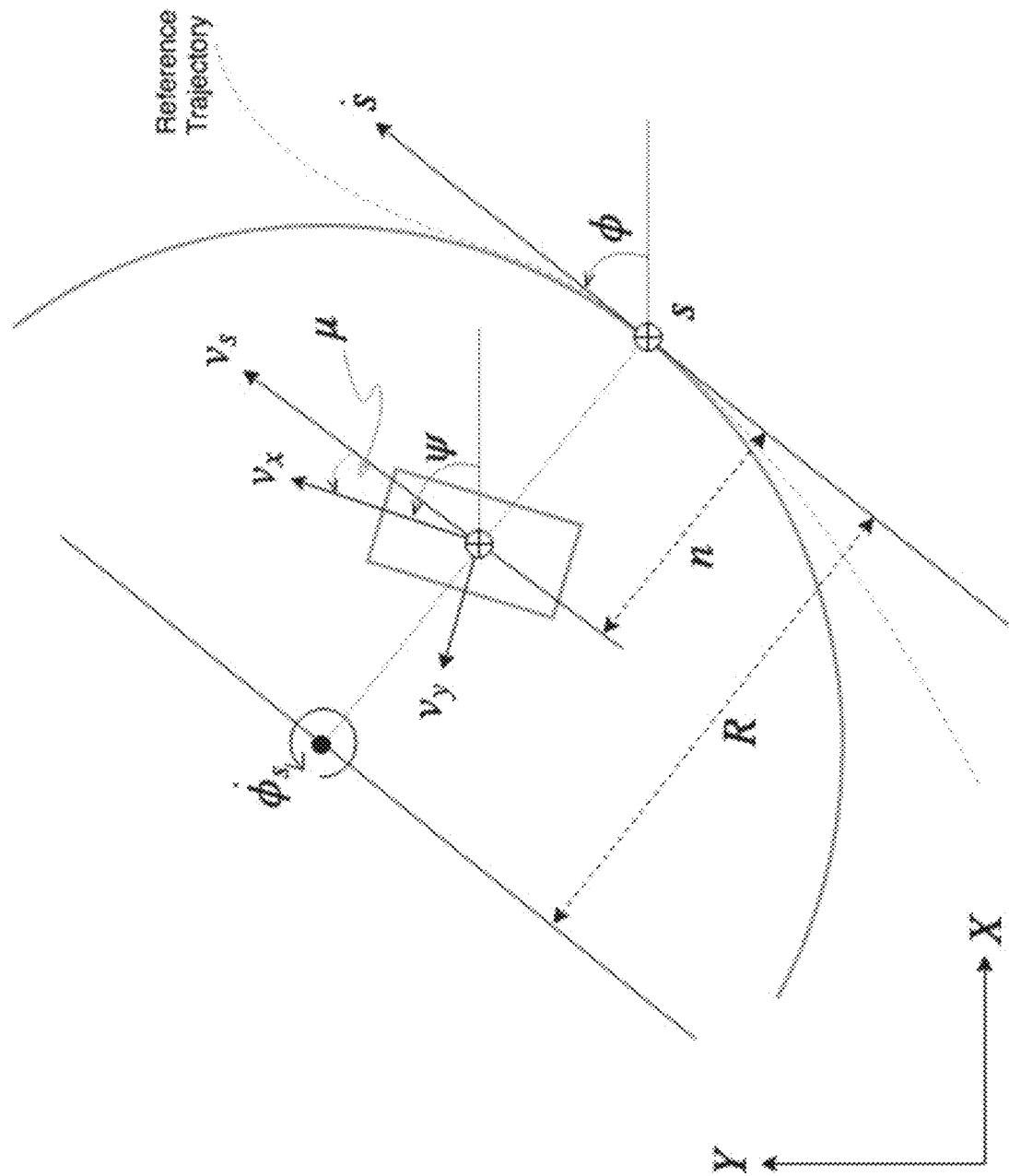

FIG. 13D illustrates an example of a coordinate system that can be used by AV system 120 when operating AV 100. AV 100 is associated with a vector $\tilde{x}$, where:

$$\tilde{x} = \begin{bmatrix} s \\ n \\ \mu \\ v_x \\ v_y \end{bmatrix} \begin{cases} \text{progress} \\ \text{lateral error} \\ \text{local heading:} \mu = \psi - \phi \\ \text{longitudinal velocity} \\ \text{lateral velocity} \end{cases}$$

Arc velocity $\dot{s}$ provides a way of describing the motion of AV 100 along a reference trajectory parameterized by s. Spatial parameterization is paired with the use of curvilinear coordinates. The projected velocity $v_s$ of AV 100 on to the arc velocity $\dot{s}$ can be derived geometrically from FIG. 13D:

$$v_s = v_x \cos(\mu) - v_y \sin(\mu)$$

$$v_s = (R-n)\dot{\phi}_s$$

where $v_x, v_y$ is the longitudinal and lateral velocity of AV 100 respectively. R(s) is the local radius of the reference trajectory. Similarly, the arc velocity $\dot{s}$ can be described geometrically:

$$\dot{s} = R(s)\dot{\phi}_s$$

Equating the two descriptions of $v_s$ and substituting in $\dot{\phi}_s$ results in:

$$\dot{s} = \frac{R(s)(v_x \cos(\mu) - v_y \sin(\mu))}{R(s) - n}$$

The above equation can be expressed in terms of curvature $$\kappa(s) = \frac{1}{R(s)}$$

to provide the definition of the arc velocity in terms of variables of local variables:

$$\dot{s} = \frac{v_x \cos(\mu) - v_y \sin(\mu)}{1 - n\kappa}$$

For readability sake, $\kappa(s)$ is denoted simply as $\kappa$, since it is always referred to herein with respect to a trajectory parameterized by s. Hence, this expression can be used to convert between space and time parameterization.

The continuous time dynamics $\dot{n}$ of the lateral error can be derived geometrically from FIG. 13D. The lateral and longitudinal velocities $v_x$ and $v_y$ of AV 100 can be projected onto the lateral error vector n in order to get $\dot{n}$:

$$\dot{n} = v_x \sin(\mu) + v_y \cos(\mu)$$

In order to obtain the local heading $\dot{\mu}$, the difference of the yaw rate $\dot{\psi}$ of AV 100 and the angular velocity of the curve $\dot{\phi}$ are determined:

$$\dot{\mu} = \dot{\psi} - \dot{\phi}$$

$$\dot{\mu} = \dot{\psi} - \frac{v_s}{R-n}$$

Substituting in $v_s$ and expressing in terms of curvature $\kappa = 1/R$ results in:

$$\dot{\mu} = \dot{\psi} - \frac{v_x \cos(\mu) - v_y \sin(\mu)}{1 - n\kappa}$$

$$\dot{\mu} = \dot{\psi} - \dot{s}\kappa$$

The above defines a state space in a curvilinear coordinate frame. All states are defined with respect to the center of gravity (CoG) of AV 100. An additional three slack variables can be introduced as additional inputs to allow for soft constraints for a kinematic model. The kinematic model uses the following variables:

State Variables:

$$\bar{x} = \begin{bmatrix} s \\ n \\ \mu \\ v \\ a \\ \delta \\ \dot{\delta} \end{bmatrix} \begin{cases} \text{progress} \\ \text{lateral error} \\ \text{local heading: } \mu = \psi - \phi_s \\ \text{velocity} \\ \text{acceleration} \\ \text{steering angle} \\ \text{steering rate} \end{cases}$$

Input Variables:

$$\bar{u} = \begin{bmatrix} u_{jerk} \\ u_{\ddot{\delta}} \end{bmatrix} \begin{cases} \text{jerk} \\ \text{steering rate} \end{cases}$$

Slack Variables (Input):

$$\bar{s} = \begin{bmatrix} s_n \\ s_v \\ s_a \end{bmatrix} \begin{cases} \text{slack on lateral error} \\ \text{slack on velocity} \\ \text{slack on acceleration} \end{cases}$$

A kinematic bicycle model allows a side slip angle $\beta$ to be defined geometrically and hence express $v_x, v_y$ and yaw rate $\dot{\psi}$ terms of $\beta$:

$$\dot{x} = \begin{bmatrix} \dot{s} \\ \dot{n} \\ \dot{\mu} \\ \dot{v} \\ \dot{a} \\ \dot{\delta} \\ \ddot{\delta} \end{bmatrix} = \begin{bmatrix} \frac{v \cos(\mu + \beta)}{1 - n\kappa} \\ v \sin(\mu + \beta) \\ \frac{v}{l_r}\sin(\beta) - \kappa \frac{v\cos(\mu + \beta)}{1 - n\kappa} \\ a \\ u_{jerk} \\ \dot{\delta} \\ u_{\ddot{\delta}} \end{bmatrix}$$

$$\beta = \arctan\left(\frac{l_r}{l_r + l_f}\tan(\delta_{real})\right)$$

where $l_f := $ length from front of AV to CoG
$l_f := $ length from front of AV to CoG A formulation that combines a linear dynamic bicycle model with the above kinematic bicycle model can be formulated as described below. The combined formulation has a few differences from the above kinematic formulation, including:

1) the states space includes lateral speed $v_y$ and yaw rate $\omega_z$;

2) the formulation includes a fusion of kinematic and dynamic models;

3) to reduce model order, a simple steering system model is optional; and 4) the station progress variable s is not formulated.

Since most of the formulation details are inherited from the above kinematic bicycle model, only the differences are listed below. The state variables for an exemplary combined linear dynamic bicycle model with a low speed kinematic model are as follows:

State Variables:

$$\bar{x} = \begin{bmatrix} n \\ \mu \\ v_x \\ a_x \\ \delta \\ \dot{\delta} \\ v_y \\ \omega_z \end{bmatrix} \begin{Bmatrix} \text{lateral error} \\ \text{local heading: } \mu = \psi - \phi_s \\ \text{longitudinal velocity} \\ \text{longitudinal acceleration} \\ \text{steering angle} \\ \text{steering angle rate} \\ \text{lateral speed} \\ \text{yaw rate} \end{Bmatrix}$$

Input Variables:

$$\bar{u} = \begin{bmatrix} u_{jerk} \\ u_{\ddot{\delta}} \end{bmatrix} \begin{Bmatrix} \text{jerk} \\ \text{steering acceleration} \end{Bmatrix}$$

Slack Variables (Input):

$$\bar{s} = \begin{bmatrix} s_n \\ s_v \\ s_a \end{bmatrix} \begin{Bmatrix} \text{slack on lateral error} \\ \text{slack on longitudinal velocity} \\ \text{slack on longitudinal acceleration} \end{Bmatrix}$$

The dynamic equations governing these state variables are described as a mix of dynamic and kinematic parts:

The Dynamic Part:

$$f_{dyn}(x) = \begin{bmatrix} v_x \sin(\mu) + v_y \cos(\mu) \\ \omega_z - \kappa \dfrac{v_x \cos(\mu) - v_y \sin(\mu)}{1 - n\kappa} \\ a_x + v_y \omega_z \\ u_{jerk} \\ \dot{\delta} \\ u_{\ddot{\delta}} \\ -v_x \omega_z + \dfrac{1}{\text{mass}}(F_{yf}\cos(\delta_{real}) + F_{yr}) \\ \dfrac{1}{I_z}(F_{yf} l_f \cos(\delta_{real}) - F_{yr} l_r) \end{bmatrix}$$

$$F_{yf} = C_f\left(\delta_{real} - \arctan\left(\dfrac{\omega_z l_f + v_y}{v_{sat}}\right)\right)$$

$$F_{yr} = C_r\left(\arctan\left(\dfrac{\omega_z l_f + v_y}{v_{sat}}\right)\right)$$

where $$v_{sat} = \eta_{dyn} v_x + (1 - \eta_{dyn})$$

$$\eta_{dyn} = \dfrac{1}{1 + \exp(-\sigma_{trans}(v_x - v_{trans}))}$$

$\sigma_{trans} :=$ stiffness of kine & dyn transition $v_{trans} :=$ kine & dyn transition speed The Kinematic Part:

$$f_{kine}(x) = \begin{bmatrix} v_x \sin(\mu) + v_{y,kine} \cos(\mu) \\ \omega_{z,kine} - \kappa \dfrac{v_x \cos(\mu) - v_{y,kine} \sin(\mu)}{1 - n\kappa} \\ a_x + v_{y,kine} \omega_{z,kine} \\ u_{jerk} \\ \dot{\delta} \\ u_{\ddot{\delta}} \\ k_{vy,kine}(v_{y,kine} - v_y) \\ k_{\omega z,kine}(\omega_{z,kine} - \omega_z) \end{bmatrix}$$

$$v_{y,kine} = \omega_{z,kine} l_r$$

$$\omega_{z,kine} = \dfrac{v_x}{l_f + l_r} \tan(\delta)$$

where $k_{vy,kine}:=$ tuning parameter for $v_y$ convergence rate to kinematic dynamics $k_{\omega z,kine}:=$ tuning parameter for $\omega_z$ convergence rate to kinematic dynamics The dynamic part and the kinematic part are combined into a single movement model using a sigmoid function:

$$\dot{x} = \eta_{dyn} f_{dyn}(x) + (1 - \eta_{dyn}) f_{kine}(x)$$

Combining the kinematic model with the dynamic model avoids a low speed singularity which occurs with the dynamic formulation. This low speed singularity can make AV system 120 unable to find solutions because of numerical feasibility issues. Combining the two models using a sigmoid function maintains a continuously differentiable vector field for the combined movement model. While the kinematic part of the movement model governs low speed dynamics, the speed for the dynamic part of the model is protected with $v_{sat}$, which is also dependent on the ratio $\eta_{dyn}$ used in the sigmoid function.

Figure 13E:
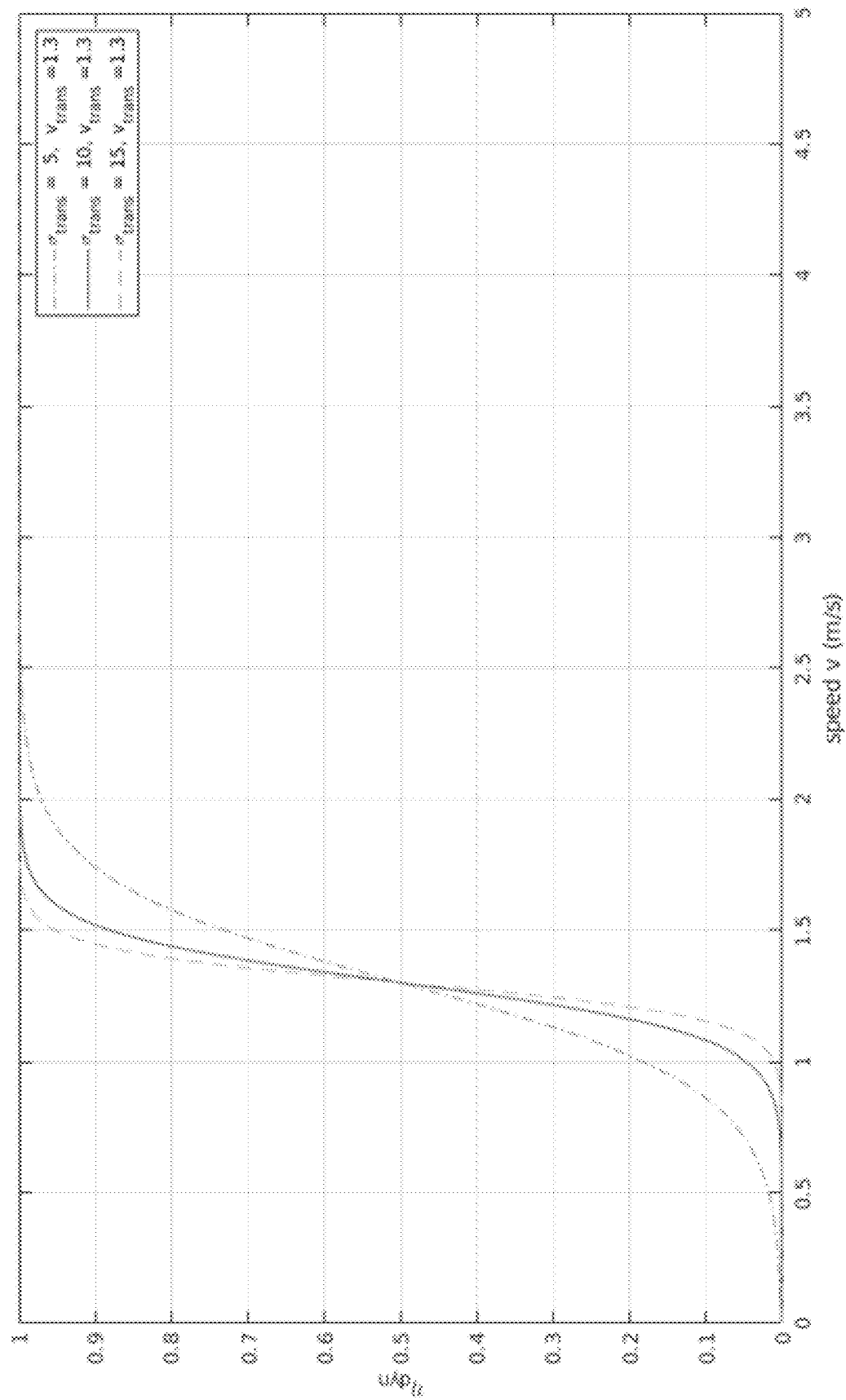

FIG. 13E illustrates an example of the sigmoid function for combining the kinematic model and the dynamic model. As shown in FIG. 13E, the kinematic part of the movement model is used below about 0.5 m/s and the dynamic part of the movement model is used above about 2 m/s. In between about 0.5 and 2 m/s, the sigmoid function allows for a smooth transition between the kinematic model and the dynamic model.

Figure 14A:
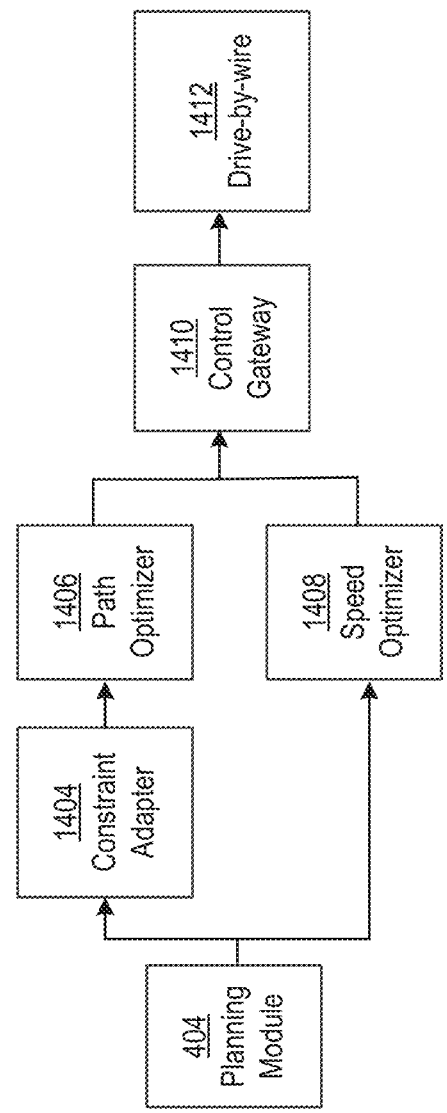
FIGS. 14A-14G illustrate examples of control architectures.

FIG. 14A illustrates an example of control architecture 1400A for control module 406 (as shown in FIG. 4). In some embodiments, control architecture 1400A includes microcontrollers with embedded processing circuits. A reference trajectory (e.g., trajectory 414 as shown in FIGS. 13A and 13B before being adjusted), lateral constraints 1304, and speed constraints (e.g., roadway speed limits, physical acceleration/deceleration limits of the vehicle, predetermined acceleration/deceleration comfort boundaries (e.g., acceleration/deceleration boundaries selected based on a level of comfort AV 100 is intended to provide to a passenger, where acceleration/deceleration beyond the boundaries may decrease passenger comfort), limits imposed by a lead vehicle) are provided by planning module 404. Lateral constraints 1304 and the reference trajectory are provided to path optimizer 1406 (e.g., via constraint adapter 1404), and speed constraints are provided to speed optimizer 1408.

In some embodiments, lateral constraints 1304 and/or the reference trajectory are provided from planning module 404 at a first frequency (e.g., 50 Hz). If path optimizer 1406 operates at a different frequency (e.g., 20 Hz), then constraint adapter 1404 is used to adjust the lateral constraints and/or reference trajectory to the frequency of the path optimizer 1406. Constraint adapter 1404 operates in series with path optimizer 1406. In some embodiments, constraint adapter 1404 samples a reference path and speed constraints with respect to the position of AV 100 to generate the reference trajectory being provided to path optimizer 1406 (e.g., the reference path is converted to the time domain). In some embodiments (e.g., if path optimizer 1406 operates at the same frequency as planning module 404), lateral constraints 1304 and the reference trajectory are provided to path optimizer 1406 directly from planning module 404 (e.g., without passing through constraint adapter 1404).

Path optimizer 1406 determines a set of steering commands (e.g., steering input 1108) based at least in part on the reference trajectory and lateral constraints 1304. The set of steering commands adjust the reference trajectory within the lateral constraints 1304 to avoid potential obstacles, such as shown in FIG. 13C. In some embodiments, the steering commands determined by path optimizer 1406 result in AV 100 using an adjusted trajectory that keeps AV 100 approximately centered between lateral constraints 1304, such as shown in FIG. 13C.

In some embodiments, path optimizer 1406 determines the set of steering commands based in part on a lateral position of AV 100 over time. The lateral position is determined based on multiple factors. The factors including a distance of AV 100 to an obstacle (e.g., a stopped vehicle on the shoulder), a distance of AV 100 from the reference trajectory, and a threshold of lateral change (e.g., maximum rate of turning of vehicle). In some embodiments, each of these factors is weighted based on the importance of each factor when determining the set of steering commands (e.g., more important factors are given a greater weighting value).

Speed optimizer 1408 operates in parallel to path optimizer 1406 (and, in some embodiments, constraint adapter 1404). Speed optimizer 1408 determines a set of speed commands (e.g., throttle input 1106) based at least in part on the speed constraints. The set of speed commands control the speed of AV 100 within the speed constraints. For example, the speed commands may keep AV 100 a safe distance behind a lead vehicle the AV is following. In control architecture 1400A, the speed commands are determined without respect to the steering commands or lateral constraints, and the steering commands are determined without respect to speed commands or speed constraints (e.g., the speed commands are determined independently from the steering commands by using different modules operating in parallel).

In some embodiments, speed optimizer 1408 determines the set of speed commands based in part on a target speed of AV 100 over time. The target speed is a speed within the set of speed constraints that satisfies a comfort factor (e.g., an acceleration/deceleration rate is within predetermined acceleration/deceleration comfort boundaries).

After the set of steering commands and the set of speed commands have been determined, drive-by-wire module 1412 navigates AV 100 according to the steering commands and speed commands. In some embodiments, control gateway 1410 receives the steering and speed commands and performs a safety check before passing commands to drive-by-wire module 1412. Control gateway 1410 operates in series with drive-by-wire module 1412. In some embodiments, control gateway 1410 determines whether the steering commands and the speed commands satisfy a safety factor (e.g., an estimated likelihood that the steering and speed commands could result in a collision or dangerous/illegal maneuver is less than a threshold). If the safety factor is satisfied, the steering and speed commands are passed to drive-by-wire module 1412 to navigate AV 100 according to the commands. If the safety factory is not satisfied (e.g., an estimated likelihood that the steering and speed commands could result in a collision or dangerous/illegal maneuver is greater than a threshold), AV 100 is prevented from being navigated according to the steering and speed commands.

Figure 14B:
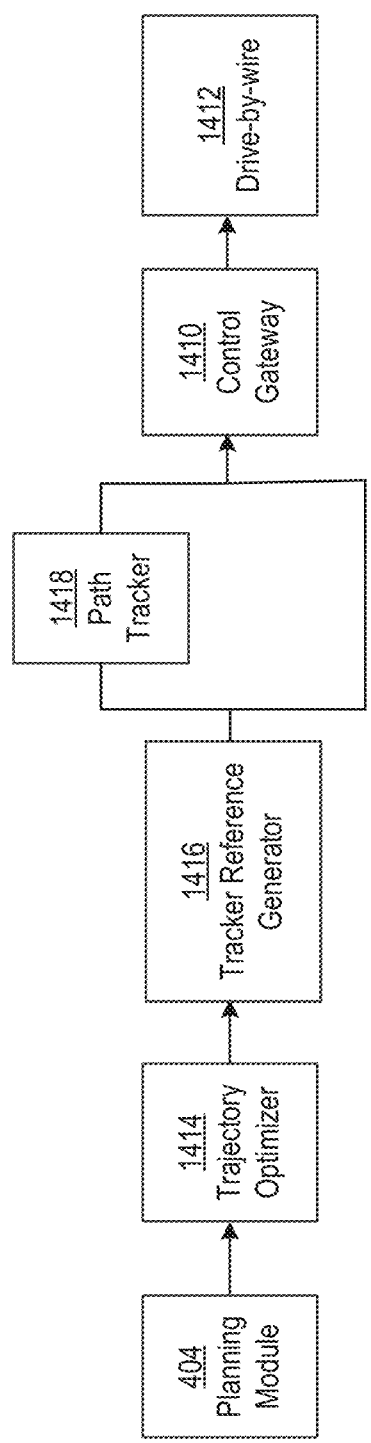

FIG. 14B illustrates an example of control architecture 1400B for control module 406 (as shown in FIG. 4). In some embodiments, control architecture 1400B includes microcontrollers with embedded processing circuits. Control architecture 1400B replaces constraint adapter 1404, path optimizer 1406, and speed optimizer 1408 as shown in FIG. 14A with trajectory optimizer 1414, tracker reference generator 1416, and path tracker 1418. A reference trajectory (e.g., trajectory 414 as shown in FIGS. 13A and 13B before being adjusted), lateral constraints 1304, and speed constraints (e.g., roadway speed limits, physical acceleration/deceleration limits of the vehicle, predetermined acceleration/deceleration comfort boundaries (e.g., acceleration/deceleration boundaries selected based on a level of comfort AV 100 is intended to provide to a passenger, where acceleration/deceleration beyond the boundaries may decrease passenger comfort), limits imposed by a lead vehicle) are provided by planning module 404.

Trajectory optimizer 1414 determines a predicted path for AV 100 and a speed profile for the predicted path based on the reference trajectory, the set of lateral constraints, and the set of speed constraints. The predicted path is a path that adjusts the reference trajectory within the lateral constraints. The speed profile includes the speeds at which AV 100 is predicted to travel along the predicted path.

Tracker reference generator 1416 operates in series with trajectory optimizer 1414. Tracker reference generator 1416 determines a reference point of AV 100 along the predicted path and a speed command associated with the reference point based at least in part on the predicted path and the speed profile. The reference point can be, e.g., a point on the predicted path that is nearest to the location of AV 100. In some embodiments, tracker reference generator 1416 determines the speed command based in part on a target speed of AV 100 over time. The target speed is a speed within the set of speed constraints that satisfies a comfort factor (e.g., an acceleration/deceleration rate is within predetermined acceleration/deceleration comfort boundaries).

In some embodiments, the predicted path includes path data at a first frequency (e.g., 20 Hz). Tracker reference generator 1416 increases the frequency of the path data to a second frequency higher than the first frequency (e.g., 100 Hz). In some embodiments, increasing the frequency of path data to the second frequency includes interpolating between discontinuities in the path data (e.g., abrupt changes in steering or speed are smoothed over).

Tracker reference generator 1416 provides the reference point to path tracker 1418 and, in some embodiments, provides the speed command to control gateway 1410.

Path Tracker 1418 determines a steering command based at least in part on the reference point of the vehicle. In some embodiments, path tracker 1418 determines the steering command based in part on a lateral position of AV 100 over time. The lateral position is determined based on multiple factors. The factors include a distance of AV 100 to an obstacle (e.g., a stopped vehicle on the shoulder), a distance of AV 100 from the reference trajectory, and a threshold of lateral change (e.g., maximum rate of turning of vehicle without impacting passenger comfort). In some embodiments, each of these factors is weighted based on the importance of each factor when determining the steering command. In some embodiments, path tracker 1418 determines the steering command based on a dynamic bicycle model using the reference point of the vehicle on the predicted path.

Drive-by-wire module 1412 navigates AV 100 according to the steering commands and speed commands. In some embodiments, control gateway 1410 receives the steering command from path tracker 1418 and the speed command from tracker reference generator 1416, and then performs a safety check before passing commands to drive-by-wire module 1412. Control gateway 1410 operates in series with drive-by-wire module 1412. In some embodiments, control gateway 1410 determines whether the steering commands and the speed commands satisfy a safety factor (e.g., an estimated likelihood that the steering and speed commands could result in a collision or dangerous/illegal maneuver is less than a threshold). If the safety factor is satisfied, the steering and speed commands are passed to drive-by-wire module 1412 to navigate AV 100 according to the commands. If the safety factory is not satisfied (e.g., an estimated likelihood that the steering and speed commands could result in a collision or dangerous/illegal maneuver is more than a threshold), AV 100 is prevented from being navigated according to the steering and speed commands.

Figure 14C:
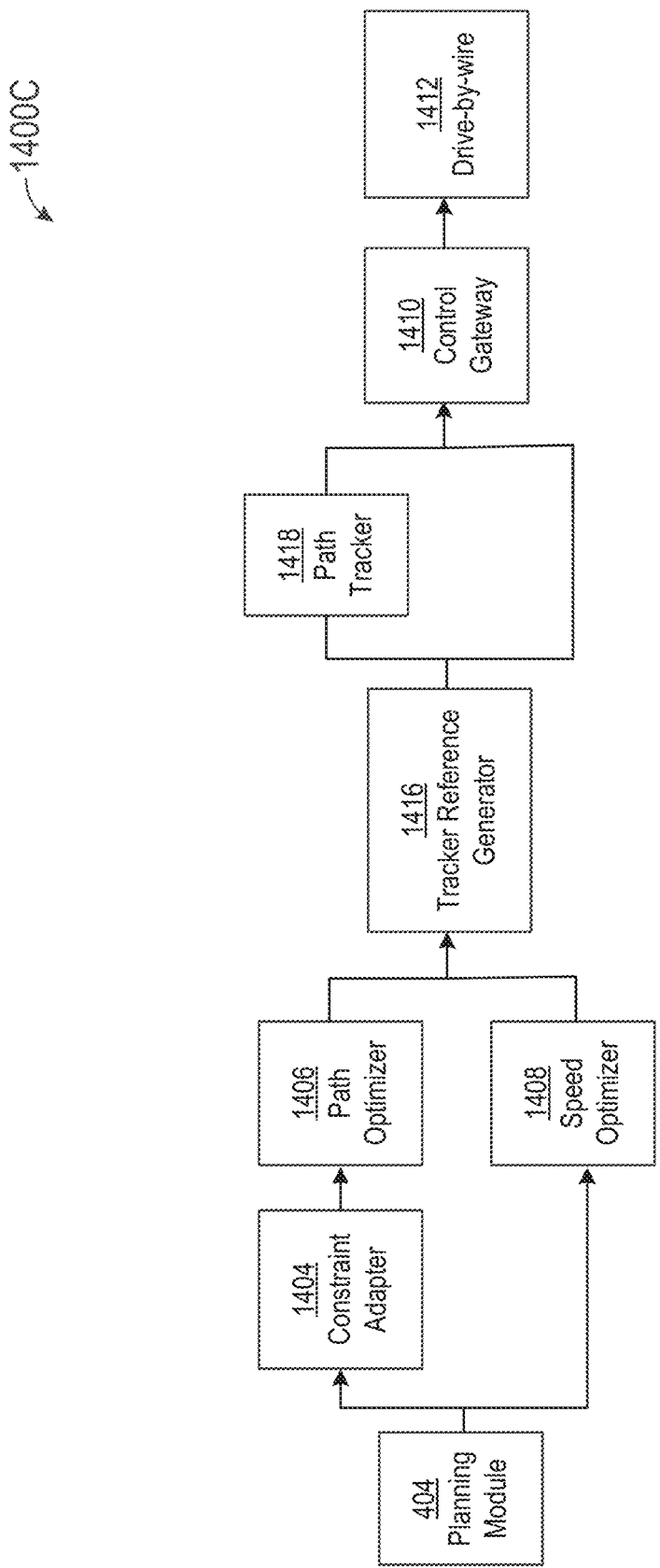

FIG. 14C illustrates an example of control architecture 1400C for control module 406 (as shown in FIG. 4). In some embodiments, control architecture 1400C includes microcontrollers with embedded processing circuits. Control architecture 1400C combines modules of control architecture 1400A and modules of control architecture 1400B. Instead of using trajectory optimizer 1414 as shown in FIG. 14B, control architecture 1400C uses constraint adapter 1404, path optimizer 1406, and speed optimizer 1408 as shown in FIG. 14A. Path optimizer 1406 determines a set of steering commands as described in reference to FIG. 14A, and speed optimizer 1408 determines a set of speed commands as described in reference to FIG. 14A.

In some embodiments, the set of steering commands includes steering data at a first frequency (e.g., 20 hz). Tracker reference generator 1416 increases the frequency of the steering data to a second frequency higher than the first frequency (e.g., 100 Hz). In some embodiments, increasing the frequency of the steering data to the second frequency includes interpolating between discontinuities in the steering data (e.g., abrupt changes in steering are smoothed over). Tracker reference generator 1416 determines a predicted path based on the steering data at the second frequency. Tracker reference generator 1416 then determines a reference point of AV 100 along the predicted path based at least in part on a current state of AV 100. The reference point can be, e.g., a point on the predicted path that is nearest to the location of AV 100.

Tracker reference generator 1416 provides the reference point and the set of steering commands to path tracker 1418 and, in some embodiments, provides the set of speed commands to control gateway 1410.

Path Tracker 1418 adjusts one or more steering commands in the set of steering commands based at least in part on the reference point of the vehicle. In some embodiments, path tracker 1418 determines a lateral error between the current state of the vehicle and the reference point of the vehicle on the predicted path, and uses the lateral error to determine how to adjust one or more of the steering commands. In some embodiments, path tracker 1418 determines how to adjust one or more of the steering commands based on a dynamic bicycle model using the reference point of the vehicle on the predicted path.

Drive-by-wire module 1412 navigates AV 100 according to the steering commands (including any adjusted commands) and speed commands. In some embodiments, control gateway 1410 receives the adjusted set of steering command from path tracker 1418 and the set of speed commands from tracker reference generator 1416, and then performs a safety check before passing commands to drive-by-wire module 1412. Control gateway 1410 operates in series with drive-by-wire module 1412. In some embodiments, control gateway 1410 determines whether the steering commands and the speed commands satisfy a safety factor (e.g., whether an estimated likelihood that the steering and speed commands could result in a collision or dangerous/illegal maneuver is more or less than a threshold). If the safety factor is satisfied (e.g., the estimated likelihood that the steering and speed commands could result in a collision or dangerous/illegal maneuver is less than the threshold), the steering and speed commands are passed to drive-by-wire module 1412 to navigate AV 100 according to the commands. If the safety factory is not satisfied (e.g., the estimated likelihood that the steering and speed commands could result in a collision or dangerous/illegal maneuver is more than the threshold), AV 100 is prevented from being navigated according to the steering and speed commands.

Figure 14D:
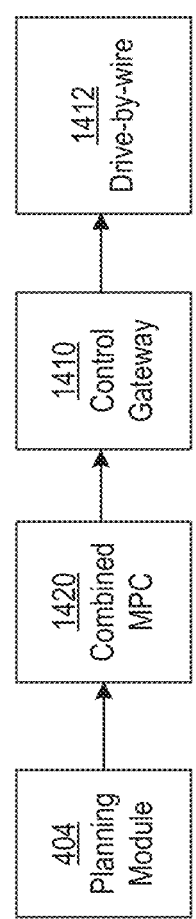

FIG. 14D illustrates an example of control architecture 1400D for control module 406 (as shown in FIG. 4). In some embodiments, control architecture 1400D includes microcontrollers with embedded processing circuits. Control architecture 1400D replaces modules shown in FIGS. 14A and 14B with a combined model predictive controller (MPC) 1420. Combined MPC 1420 receives a reference trajectory (e.g., trajectory 414 as shown in FIGS. 13A and 13B before being adjusted), lateral constraints 1304, and speed constraints (e.g., roadway speed limits, physical acceleration/deceleration limits of the vehicle, predetermined acceleration/deceleration comfort boundaries (e.g., acceleration/deceleration boundaries selected based on a level of comfort AV 100 is intended to provide to a passenger, where acceleration/deceleration beyond the boundaries may decrease passenger comfort), limits imposed by a lead vehicle) from planning module 404.

Combined MPC 1420 determines a curvature of the reference trajectory. Based on the curvature of the reference trajectory, the set of lateral constraints, and the set of speed constraints, combined MPC 1420 then determines a set of steering commands and a set of speed commands.

In some embodiments, combined MPC 1420 determines the set of steering commands based in part on a lateral position of AV 100 over time. The lateral position is determined based on multiple factors. The factors include a distance of AV 100 to an obstacle (e.g., a stopped vehicle on the shoulder), a distance of AV 100 from the reference trajectory, and a threshold of lateral change (e.g., maximum rate of turning of vehicle). In some embodiments, each of these factors is weighted based on the importance of each factor when determining the set of steering commands.

In some embodiments, combined MPC 1420 determines the set of speed commands based in part on a target speed of AV 100 over time. The target speed is a speed within the set of speed constraints that satisfies a comfort factor (e.g., an acceleration/deceleration rate is within predetermined acceleration/deceleration comfort boundaries).

After the set of steering commands and the set of speed commands have been determined, drive-by-wire module 1412 navigates AV 100 according to the steering commands and speed commands. In some embodiments, control gateway 1410 receives the steering and speed commands from MPC 1420 and performs a safety check before passing commands to drive-by-wire module 1412. Control gateway 1410 operates in series with drive-by-wire module 1412. In some embodiments, control gateway 1410 determines whether the steering commands and the speed commands satisfy a safety factor (e.g., whether an estimated likelihood that the steering and speed commands could result in a collision or dangerous/illegal maneuver is more or less than a threshold). If the safety factor is satisfied (e.g., the estimated likelihood that the steering and speed commands could result in a collision or dangerous/illegal maneuver is less than the threshold), the steering and speed commands are passed to drive-by-wire module 1412 to navigate AV 100 according to the commands. If the safety factor is not satisfied (e.g., the estimated likelihood that the steering and speed commands could result in a collision or dangerous/illegal maneuver is more than the threshold), AV 100 is prevented from being navigated according to the steering and speed commands.

In some embodiments, combined MPC 1420 uses a combination of kinematic and dynamic models of the motion of AV 100 while determining the speed and steering commands. Combined MPC 1420 receives state information corresponding to a current state of AV 100 (e.g., speed, acceleration, steering angle, steering rate, heading). A future state of AV 100 is then predicted based on a movement model that combines dynamic and kinematic models. The movement model (including dynamic and kinematic parts) are described above with reference to FIGS. 13D-13E. As described above, a dynamic model and a kinematic model are combined using a sigmoid function. At low speeds (e.g., below about 0.5 m/s) the kinematic model is used (e.g., without using the dynamic model). At higher speeds (e.g., above about 2 m/s) the dynamic model is used (e.g., without using the kinematic model). At intermediate speeds a combination of the two models is used, where the models are combined based on the sigmoid function.

After predicting the future state of AV 100, combined MPC determines a set of steering commands and a set of speed commands based at least in part on the current state of the vehicle (e.g., the current speed, acceleration, steering angle, steering rate, heading) and the predicted future state of the vehicle, as determined by the combined movement model.

After the set of steering commands and the set of speed commands have been determined, drive-by-wire module 1412 navigates AV 100 according to the steering commands and speed commands. In some embodiments, control gateway 1410 receives the steering and speed commands from MPC 1420 and performs a safety check before passing commands to drive-by-wire module 1412. Control gateway 1410 operates in series with drive-by-wire module 1412. In some embodiments, control gateway 1410 determines whether the steering commands and the speed commands satisfy a safety factor (e.g., whether an estimated likelihood that the steering and speed commands could result in a collision or dangerous/illegal maneuver is more or less than a threshold). If the safety factor is satisfied (e.g., the estimated likelihood that the steering and speed commands could result in a collision or dangerous/illegal maneuver is less than the threshold), the steering and speed commands are passed to drive-by-wire module 1412 to navigate AV 100 according to the commands. If the safety factor is not satisfied (e.g., the estimated likelihood that the steering and speed commands could result in a collision or dangerous/illegal maneuver is more than the threshold), AV 100 is prevented from being navigated according to the steering and speed commands.

Figure 14E:
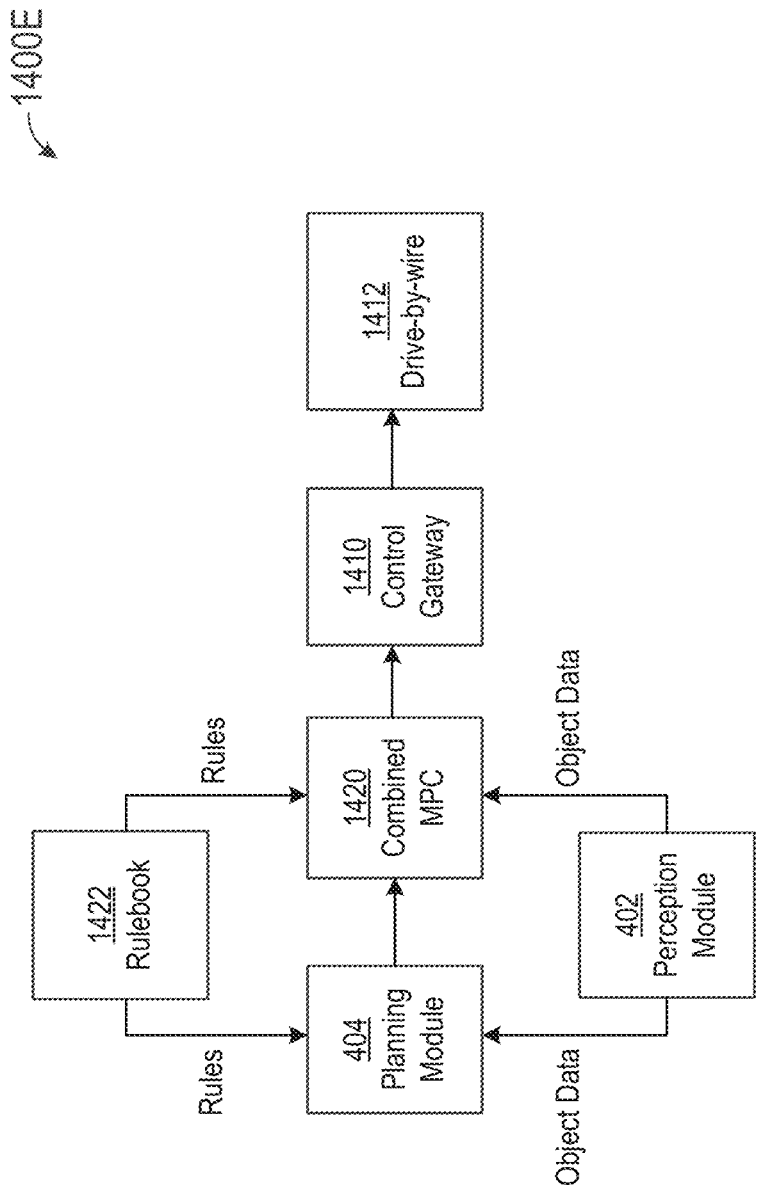

FIG. 14E illustrates an example of control architecture 1400E for control module 406 (as shown in FIG. 4). In some embodiments, control architecture 1400E includes microcontrollers with embedded processing circuits. Control architecture 1400E is similar to control architecture 1400D shown in FIG. 14D, using a combined MPC 1420 to determine speed and steering commands.

As shown in FIG. 14E, both the planning module 404 and the combined MPC 1420 receive rules from rulebook 1422. Rulebook 1422 defines high-level constraints that provide behavioral expectations for AV 100. The rules provided by rulebook 1422 are arranged in a hierarchy of rules, where rules lower in the hierarchy are only checked after rules higher in the hierarchy are checked.

Rulebook 1422 includes a subset of rules that are selected to be used by both the planning module 404 and the combined MPC 1420. In some embodiments, the subset of rules that are selected for use by combined MPC 1420 include rules associated with continuous values (e.g., speed, acceleration, distance). Whereas rules not selected for use by combined MPC 1420 include rules associated with discrete values (e.g., whether the AV 100 is moving or stopped). Examples of rules used by both the planning module 404 and the combined MPC 1420 include a proximity rule (e.g., constrains speed and lateral position based on distance to a tracked object, such as another vehicle), a stay-in-lane rule (e.g., constrains lateral position based on lane boundaries), constraints on speed (e.g., maximum speed limit, minimum speed limit, stopping at stop sign), and acceleration/deceleration constraints based on passenger comfort (e.g., constrains acceleration/deceleration to rates that are within a passenger comfort factor (e.g., avoid hard braking or sudden acceleration).

The proximity rule is a non-linear inequality constraint on both velocity and lateral position of AV 100. The goal of the proximity rule is to optimize velocity and lateral position of AV 100 and find a trajectory that maximizes the velocity of AV 100 without exceeding a minimum lateral clearance distance from a tracked object. In other words, the proximity rule provides a way for combined MPC 1420 to make a trade-off between clearance distance and velocity decrease that is imposed near obstacles (e.g., for safety).

Figure 14F:
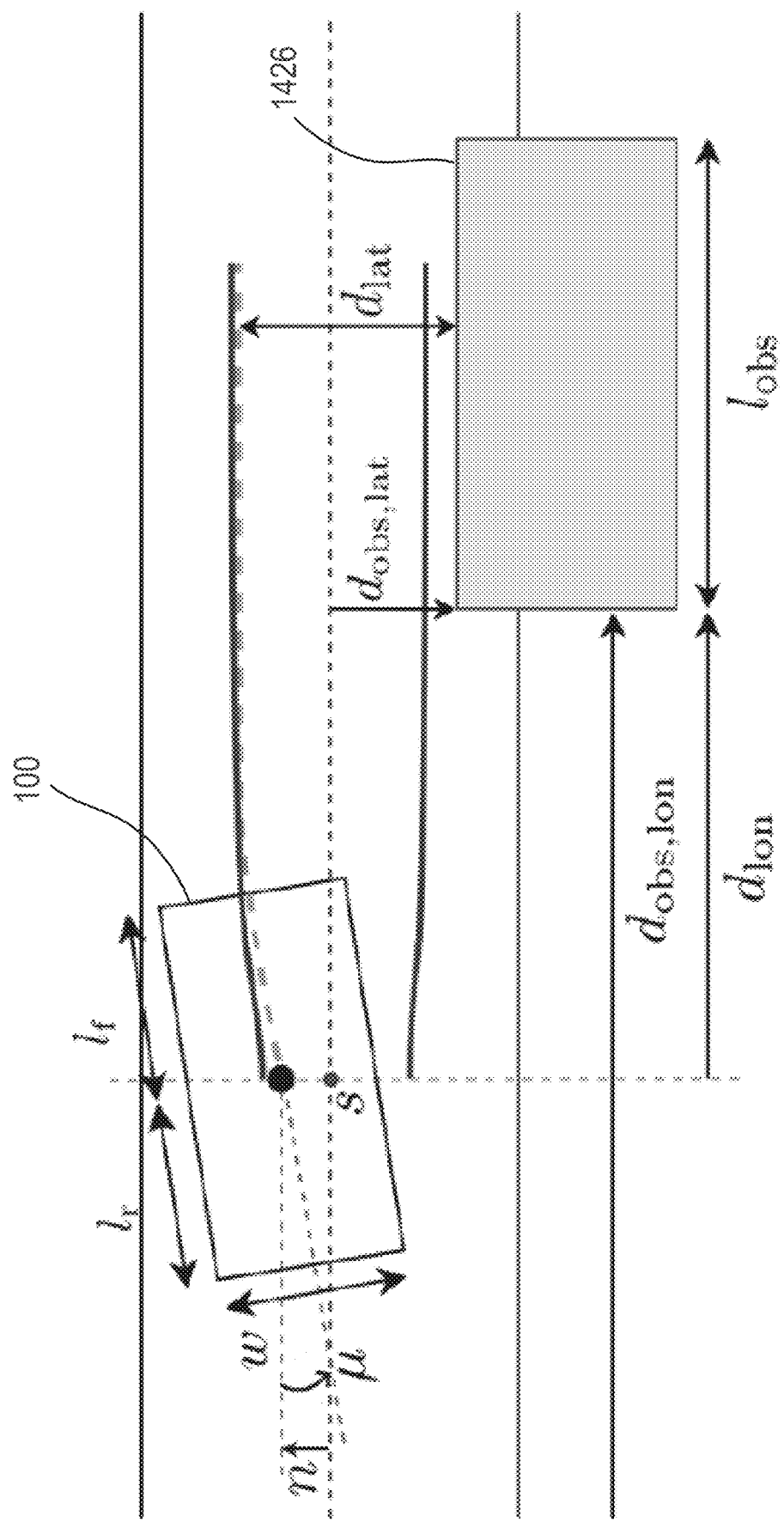

FIG. 14F illustrates an example of the parameters used in implementing the proximity rule. The proximity rule introduces a velocity constraint, $v_{max}^2 = v_{lon}^2 + v_{lat}^2$, consisting of two components. The first component, $v_{lon}^2$, is a velocity component that quadratically decreases with the longitudinal distance to an obstacle 1426 being avoided. The second component, $v_{lat}^2$, is a velocity component that increases with the clearance from the obstacle 1426. The value $v_{lon,k}^2$ is provided to the combined MPC 1420 as a run-time parameter, which is computed as the longitudinal distance to the obstacle 1426. This distance equals zero as long as the obstacle 1426 is next to AV 100, for which the rear- and front-length of AV 100, $l_r$ and $l_f$ respectively is used, as shown below:

$$d_{lon,k} = \begin{cases} d_{obs,lon} - s - l_f & \text{if } s < d_{obs,lon} - l_f \\ 0 & \text{if } d_{obs,lon} - l_f \leq s \leq d_{obs,lon} + l_{obs} + l_r, \forall k \in \{0, \ldots, N\} \\ s - l_r - d_{obs,lon} - l_{obs} & \text{if } s > d_{obs,lon} + l_{obs} + l_r \end{cases}$$

The value $d_{lon}$ is the longitudinal distance on the reference trajectory (starting at the current location of AV 100) to a location where obstacle 1426 is constraining the AV 100. The value $s_k$ is the progress along the reference trajectory at the $k^{th}$ horizon stage (also starting at the current location of AV 100). Based on this distance, the longitudinal velocity component of the constraint can be determined according to comfortable acceleration and deceleration rates, $a_{comf,accel}$ and $a_{comf,decel}$, respectively, as shown below:

$$v_{lon,k}^2 = \begin{cases} 2a_{comf,decel}d_{lon,k} & \text{if } s \leq d_{obs,lon} - l_f \\ 2a_{comf,accel}d_{lon,k} & \text{if } s > d_{obs,lon} - l_{obs} + l_r \end{cases}, \forall k \in \{0, \ldots, N\}$$

This results in two additional run-time parameters for every stage, $[v_{lon,left,k}^2, v_{lon,right,k}^2]$. Distinguishing between left and right allows AV 100 to avoid left tracks on the right side and right tracks on the left side. This is necessary information for the decision on which direction AV 100 should veer to avoid obstacle 1426. All the computations above are performed separately for left/right tracks with respect to the reference trajectory.

Combined MPC 1420 makes a trade-off is made between lateral clearance and the lateral velocity component, $v_{lat}^2$. The parameters $[v_{lon,left,k}^2, v_{lon,right,k}^2]$ are provided to combined MPC 1420, and $v_{lat}^2$ is determined as follows:

$$d_{lat,left,k} = d_{obs,lat,k} - n_k, \forall k \in \{0, \ldots, N\}$$

$$d_{lat,right,k} = n_k - d_{obs,lat,k}, \forall k \in \{0, \ldots, N\}$$

$$v_{lat,k}(n_k) = v_{ref,k} \cdot \text{sigmoid}(d_{lat\{left,right\},k}(n_k), a, c), \forall k \in \{0, \ldots, N\}$$

where a and c are the coefficients for the sigmoid function $$\frac{1}{1 + \exp(-a(d_{lat,\{left,right\}} - c))}.$$

Generally, the proximity rule specifies that the farther AV 100 is from an obstacle, the higher velocity the AV 100 can travel. The sigmoid parameters are chosen in such a way that the function is smooth with no large second order gradients and achieves maximal value of $v_{ref}$.

Using the above-defined longitudinal and lateral velocity components, the resulting velocity constraints due to the proximity rule can be defined as follows:

$$c_k^{vel}(x_k, s_k) = \begin{cases} v_k - v_{lon,left,k} - v_{lat,left,k}(n_k) - s_v, & k \leq 0 \\ v_k - v_{lon,right,k} - v_{lat,right,k}(n_k) - s_v, & k \leq 0 \end{cases}, \forall k \in \{0, \ldots, N\}$$

$$J_k(x) = (v_{lon,left,k}^2 + v_{lon,left,k}^2(n_k) - v_{ref}^2) + (v_{lon,right,k}^2 + v_{lon,right,k}^2(n_k) - v_{ref}^2), \forall k \in \{0, \ldots, N\}$$

Returning to FIG. 14E, both the planning module 404 and the combined MPC 1420 receive classified object data from perception module 404. The classified object data describes a detected object that has been grouped into a type, such as pedestrian, bicycle, automobile, traffic sign, etc. Planning module 404 then determines a reference trajectory based at least in part on the rules from rulebook 1422 (e.g., including at least some rules that are not used by the combined MPC 1420) and the classified object data.

The reference trajectory is then provided to the combined MPC 1420. The combined MPC 1420 determined (e.g., independently from determining the reference trajectory) a set of steering commands and a set of speed commands based at least in part on the reference trajectory, the classified object data, and the selected subset of rules from rulebook 1422 (e.g., the set of steering commands and the set of speed commands are determined independently from, or without being based on, at least some rules in the rulebook 1422).

After the set of steering commands and the set of speed commands have been determined, drive-by-wire module 1412 navigates AV 100 according to the steering commands and speed commands. In some embodiments, navigating AV 100 according to the set of steering commands and the set of speed commands includes violating at least one rule selected to be used by the combined MPC 1420. For example, some rules from rulebook 1422 include slack variables that allow the rule to be exceeded by a limited amount if conditions warrant the violation.

In some embodiments, control gateway 1410 receives the steering and speed commands from MPC 1420 and performs a safety check before passing commands to drive-by-wire module 1412. Control gateway 1410 operates in series with drive-by-wire module 1412. In some embodiments, control gateway 1410 determines whether the steering commands and the speed commands satisfy a safety factor (e.g., whether an estimated likelihood that the steering and speed commands could result in a collision or dangerous/illegal maneuver is more or less than a threshold). If the safety factor is satisfied (e.g., the estimated likelihood that the steering and speed commands could result in a collision or dangerous/illegal maneuver is less than the threshold), the steering and speed commands are passed to drive-by-wire module 1412 to navigate AV 100 according to the commands. If the safety factor is not satisfied (e.g., the estimated likelihood that the steering and speed commands could result in a collision or dangerous/illegal maneuver is more than the threshold), AV 100 is prevented from being navigated according to the steering and speed commands.

Figure 14G:
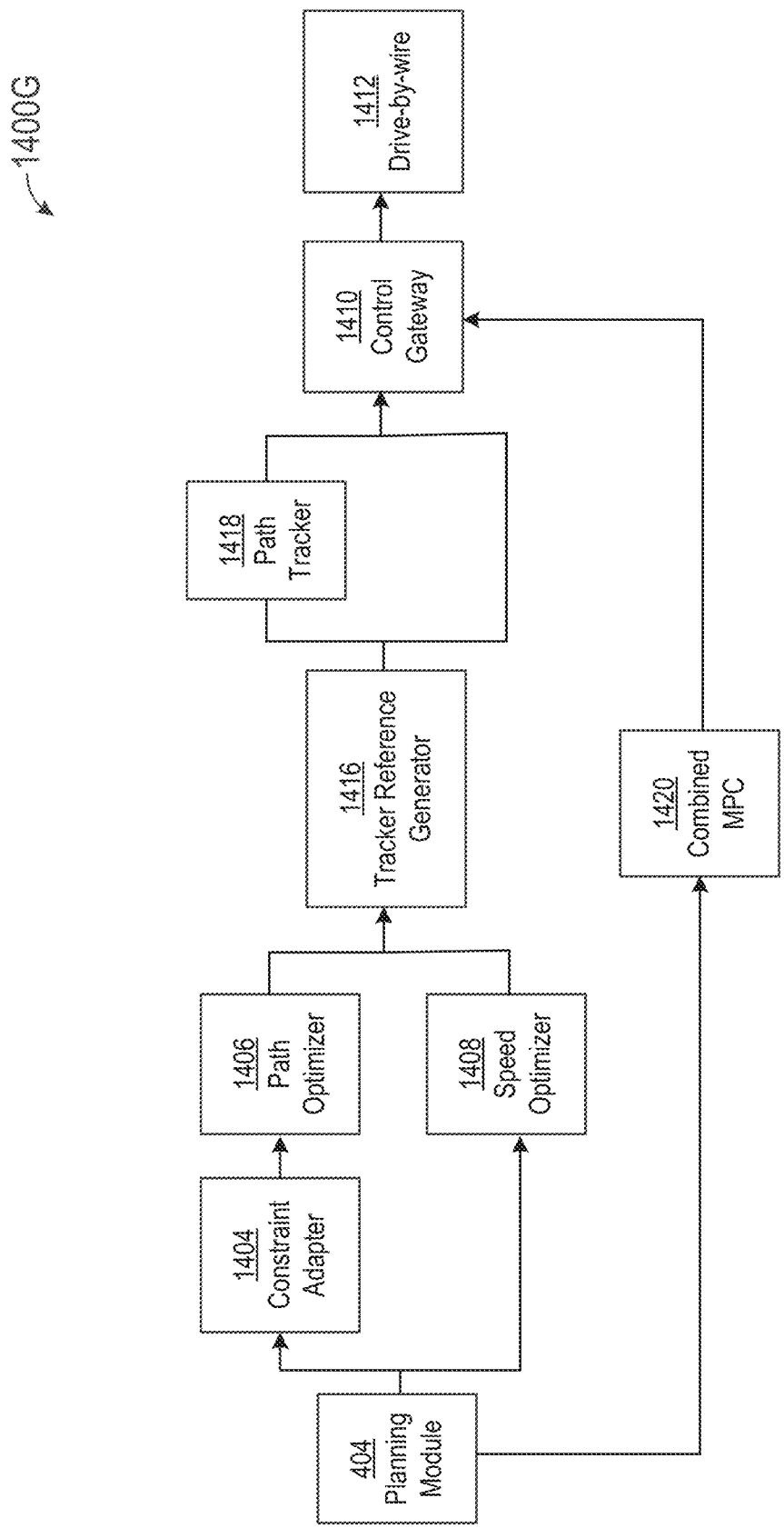

FIG. 14G illustrates an example of control architecture 1400G for control module 406 (as shown in FIG. 4). In some embodiments, control architecture 1400G includes microcontrollers with embedded processing circuits. Control architecture 1400G adds the combined MPC 1420 of FIG. 14D to control architecture 1400C as shown in FIG. 14C. A first set of steering commands and a first set of speed commands are determined by path optimizer 1406, speed optimizer 1408, tracker reference generator 1416, and path tracker 1418 as described in reference to FIG. 14C. A second set of steering commands and a second set of speed commands are determined by combined MPC 1420 as described in reference to FIG. 14D.

Control gateway 1410 determines a control scenario for AV 100. In some embodiments, the control scenario is based on the current location of AV 100 (e.g., different regions of the world may use different control scenarios). In some embodiments, the control scenario changes dynamically over time (e.g., the region where the vehicle is being operated changes). In some embodiments, the control scenario is based on the capabilities of AV 100 (e.g., processor speed, available sensors). In some embodiments, the control scenario is pre-determined and remains static over time (e.g., when the control scenario is determined based on the capabilities of AV 100).

If the control scenario meets a first set of conditions (e.g., AV 100 does not have the required capabilities for the combined MPC 1420), then control gateway 1410 selects the first set of steering commands and the first set of speed commands as determined by path optimizer 1406, speed optimizer 1408, tracker reference generator 1416, and path tracker 1418. After the first set of steering commands and the first set of speed commands have been selected, drive-by-wire module 1412 navigates AV 100 according to the first set of steering commands and the first set of speed commands.

If the control scenario meets a second set of conditions (e.g., AV 100 does not have the required capabilities for one or more of the path optimizer 1406, speed optimizer 1408, tracker reference generator 1416, or path tracker 1418), then control gateway 1410 selects the second set of steering commands and the second set of speed commands as determined by combined MPC 1420. After the second set of steering commands and the second set of speed commands have been selected, drive-by-wire module 1412 navigates AV 100 according to the second set of steering commands and the second set of speed commands.

If the control scenario meets a third set of conditions (e.g., AV 100 is capable of using all modules shown in FIG. 14G), then control gateway 1410 combines the first set of steering commands and the second set of steering commands to generate a third set of steering commands. Control gateway 1410 also combines the first set of speed commands and the second set of speed commands to generate a third set of speed commands. After the third set of steering commands and the third set of speed commands have been generated, drive-by-wire module 1412 navigates AV 100 according to the third set of steering commands and the third set of speed commands.

Example Processes for Determining Steering and Speed Commands

Figure 15:
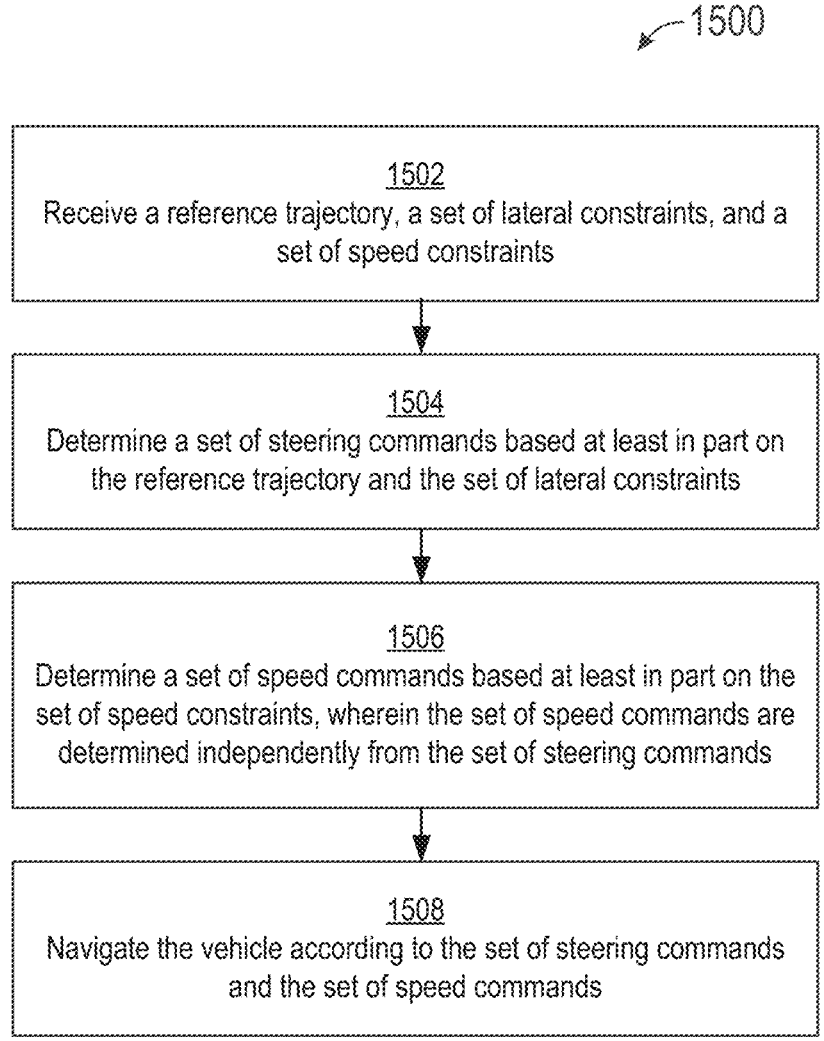
FIG. 15 is a flow chart of an example process for determining steering and speed commands.

FIG. 15 is a flow chart of an example process 1500 for determining steering and speed commands. The process 1500 is described as being performed by a control circuit (e.g., control module 406 of FIG. 4). In some embodiments, the control circuit includes microcontrollers with embedded processing circuits. In some embodiments, process 1500 can be performed by a system of one or more computers located in one or more locations. For example, the AV system 120 of FIG. 1 (or portions thereof), appropriately programmed in accordance with this specification, can perform the process 1500.

At block 1502, while a vehicle (e.g., AV 100) is operating in an autonomous mode (e.g., a fully or highly autonomous mode with automated steering, acceleration, braking, and navigation (e.g., Level 3, 4, or 5)), a control circuit (e.g., control module 406) receives a reference trajectory (e.g., a path with respect to time from planning module 404), a set of lateral constraints (e.g., "tube" constraints—maximum distances to the left and right the vehicle can safely veer from the reference trajectory at different points in time), and a set of speed constraints (e.g., roadway speed limits, physical acceleration/deceleration limits of the vehicle, pre-determined acceleration/deceleration comfort boundaries).

In some embodiments, the lateral constraints correspond to lane boundaries. In some embodiments, the lateral constraints are adjusted to avoid obstacles on or near the roadway (e.g., parked cars). In some embodiments, receiving the reference trajectory includes sampling, using the control circuit (e.g., at constraint adapter 1404), a reference path (e.g., from planning module 404) and the set of speed constraints with respect to the position of the vehicle to generate the reference trajectory (e.g., the reference path in the time domain). In some embodiments, the constraint adapter 1404 runs at a rate (e.g., 50 Hz) different than the rate (e.g., 20 Hz) of the path optimizer 1406.

At block 1504, the control circuit determines (e.g., at path optimizer 1406) a set of steering commands based at least in part on the reference trajectory and the set of lateral constraints (e.g., a set of steering commands that adjust the reference trajectory within the lateral constraints to avoid objects). In some embodiments, determining the set of steering commands includes determining a lateral position of the vehicle over time based on a plurality of steering factors, the steering factors including a distance of the vehicle to an obstacle (e.g., a stopped vehicle on the shoulder), a distance of the vehicle from the reference trajectory, and a threshold of lateral change (e.g., maximum rate of turning of vehicle). In some embodiments, the control circuit determines the set of steering commands based at least in part on the determined lateral position of the vehicle over time.

In some embodiments, the set of steering commands includes steering data at a first frequency (e.g., 20 hz). In some embodiments, determining the set of steering commands includes increasing (e.g., at tracker reference generator 1416) the frequency of the steering data to a second frequency higher than the first frequency (e.g., 100 Hz), determining (e.g., at tracker reference generator 1416) a predicted path based on the steering data at the second frequency, determining (e.g., at tracker reference generator 1416) a reference point of the vehicle along the predicted path based at least in part on a current state of the vehicle (e.g., a point on the predicted path that is nearest to the location of the vehicle), and determining (e.g., at path tracker 1418) the set of steering commands based at least in part on the reference point of the vehicle. In some embodiments, increasing the frequency of the steering data to the second frequency includes interpolating between discontinuities in the steering data (e.g., abrupt changes in steering are smoothed over). In some embodiments, determining the set of steering commands based at least in part on the reference point of the vehicle includes determining a lateral error between the current state of the vehicle and the reference point of the vehicle on the predicted path. In some embodiments, the set of steering commands are determined based on a dynamic bicycle model using the reference point of the vehicle on the predicted path.

In some embodiments, the set of steering commands includes first steering data. In some embodiments, determining the set of steering commands includes determining (e.g., at combined MPC 1420) a curvature of the reference trajectory, determining (e.g., at combined MPC 1420) second steering data based on the curvature of the reference trajectory, the set of lateral constraints, and the set of speed constraints, and combining (e.g., at control gateway 1410) the first steering data and the second steering data to generate the set of steering commands.

At block 1506, the control circuit determines (e.g., at speed optimizer 1408) a set of speed commands based at least in part on the set of speed constraints (e.g., a set of speed commands that control the vehicle's speed within the speed constraints). In some embodiments, the set of speed commands are determined independently from the set of steering commands (e.g., the speed commands are determined without respect to the steering commands or lateral constraints, and the steering commands are determined without respect to speed commands or speed constraints). In some embodiments, determining the set of speed commands includes determining a target speed of the vehicle over time that satisfies a comfort factor (e.g., an acceleration/deceleration is within predetermined acceleration/deceleration comfort boundaries) within the set of speed constraints and determining the set of speed commands based at least in part on the determined target speed of the vehicle over time.

At block 1508, the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands satisfy a safety factor (e.g., an estimated likelihood that the steering and speed commands could result in a collision or dangerous/illegal maneuver is less than a threshold), the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands fail to satisfy a safety factor (e.g., an estimated likelihood that the steering and speed commands could result in a collision or dangerous/illegal maneuver is more than a threshold), the control circuit forgoes navigating the vehicle according to the set of steering commands and the set of speed commands.

Figure 16:
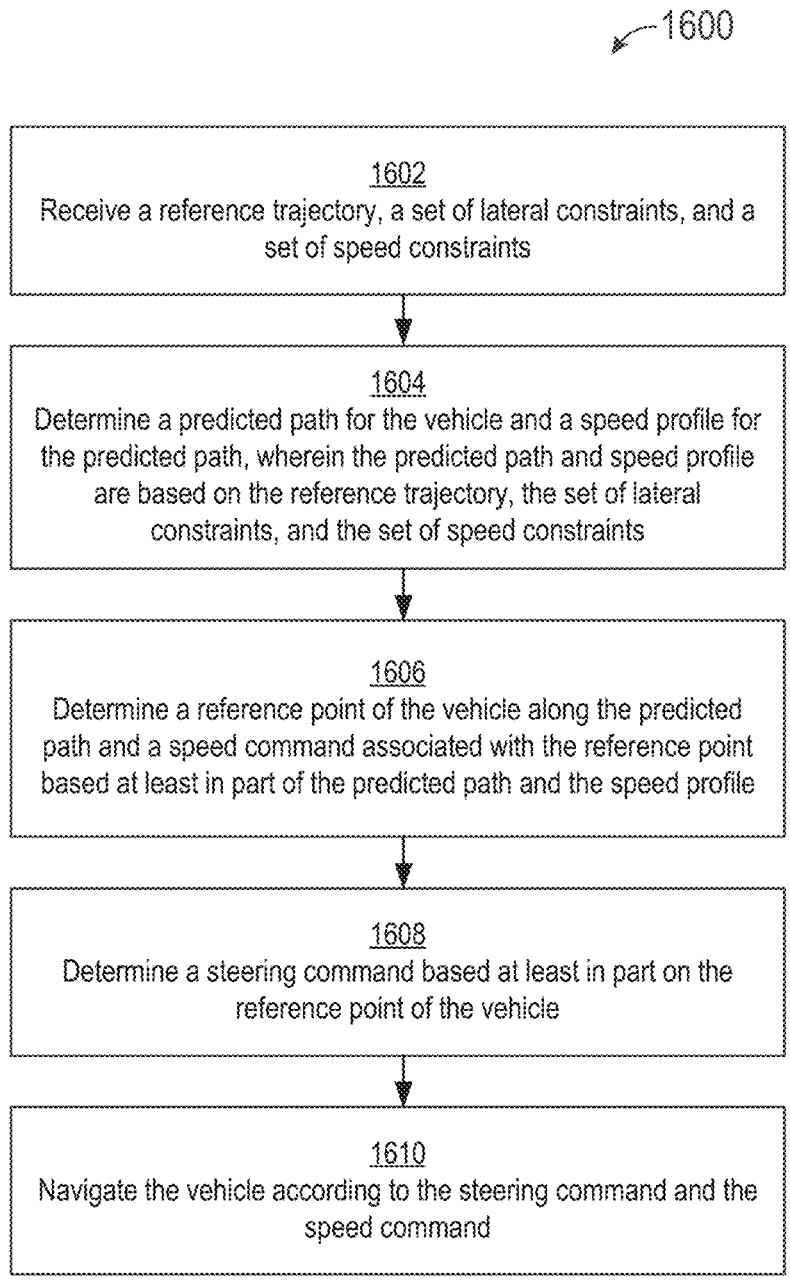
FIG. 16 is a flow chart of an example process for determining steering and speed commands.

FIG. 16 is a flow chart of an example process 1600 for determining steering and speed commands. The process 1600 is described as being performed by a control circuit (e.g., control module 406 of FIG. 4). In some embodiments, the control circuit includes microcontrollers with embedded processing circuits. In some embodiments, process 1600 can be performed by a system of one or more computers located in one or more locations. For example, the AV system 120 of FIG. 1 (or portions thereof), appropriately programmed in accordance with this specification, can perform the process 1600.

At block 1602, while a vehicle (e.g., AV 100) is operating in an autonomous mode (e.g., a fully or highly autonomous mode with automated steering, acceleration, braking, and navigation (e.g., Level 3, 4, or 5)), a control circuit (e.g., control module 406) receives a reference trajectory (e.g., a path with respect to time from planning module 404), a set of lateral constraints (e.g., "tube" constraints—maximum distances to the left and right the vehicle can safely veer from the reference trajectory at different points in time), and a set of speed constraints (e.g., roadway speed limits, physical acceleration/deceleration limits of the vehicle, predetermined acceleration/deceleration comfort boundaries). In some embodiments, the lateral constraints correspond to lane boundaries. In some embodiments, the lateral constraints are adjusted to avoid obstacles on or near the roadway (e.g., parked cars).

At block 1604, the control circuit determines (e.g., at trajectory optimizer 1414) a predicted path for the vehicle (e.g., a path that adjusts the reference trajectory within the lateral constraints to avoid objects) and a speed profile for the predicted path (e.g., a profile including the speeds at which the vehicle is predicted to travel along the predicted path). The predicted path and speed profile are based on the reference trajectory, the set of lateral constraints, and the set of speed constraints.

At block 1606, the control circuit determines (e.g., at tracker reference generator 1416) a reference point of the vehicle along the predicted path (e.g., a point on the predicted path that is nearest to the location of the vehicle) and a speed command associated with the reference point based at least in part of the predicted path and the speed profile. In some embodiments, determining the speed command includes determining a target speed of the vehicle over time that satisfies a comfort factor (e.g., an acceleration/deceleration is within predetermined acceleration/deceleration comfort boundaries) within the set of speed constraints and determining the set of speed commands based at least in part on the determined target speed of the vehicle over time. In some embodiments, the predicted path includes path data at a first frequency (e.g., 20 Hz). In some embodiments, determining the reference point of the vehicle along the predicted path includes increasing (e.g., at tracker reference generator 1416) the frequency of the path data to a second frequency higher than the first frequency (e.g., 100 Hz). In some embodiments, increasing the frequency of path data to the second frequency includes interpolating between discontinuities in the path data (e.g., abrupt changes in steering or speed are smoothed over).

At block 1608, the control circuit determines (e.g., at path tracker 1418) a steering command based at least in part on the reference point of the vehicle. In some embodiments, determining the steering command includes determining a lateral position of the vehicle over time based on a plurality of steering factors, the steering factors including a distance of the vehicle to an obstacle (e.g., a stopped vehicle on the shoulder), a distance of the vehicle from the reference trajectory, and a threshold of lateral change (e.g., maximum rate of turning of vehicle). In some embodiments, the control circuit determines the set of steering commands based at least in part on the determined lateral position of the vehicle over time. In some embodiments, the steering command is determined based on a dynamic bicycle model using the reference point of the vehicle on the predicted path.

In some embodiments, the steering command includes first steering data. In some embodiments, determining the steering command includes determining (e.g., at combined MPC 1420) a curvature of the reference trajectory, determining (e.g., at combined MPC 1420) second steering data based on the curvature of the reference trajectory, the set of lateral constraints, and the set of speed constraints, and combining (e.g., at control gateway 1410) the first steering data and the second steering data to generate the steering command.

At block 1610, the control circuit navigates (e.g., at drive-by-wire module 1412) the vehicle according to the steering command and the speed command. In some embodiments, in accordance with a determination (e.g., at control gateway 1410) that the steering command and the speed command satisfy a safety factor (e.g., an estimated likelihood that the steering and speed commands could result in a collision or dangerous/illegal maneuver is less than a threshold), the control circuit navigates (e.g., at drive-by-wire module 1412) the vehicle according to the steering command and the speed command. In some embodiments, in accordance with a determination (e.g., at control gateway 1410) that the steering command and the speed command fail to satisfy a safety factor (e.g., an estimated likelihood that the steering and speed commands could result in a collision or dangerous/illegal maneuver is more than a threshold), the control circuit forgoes navigating the vehicle according to the steering command and the speed command.

Figure 17:
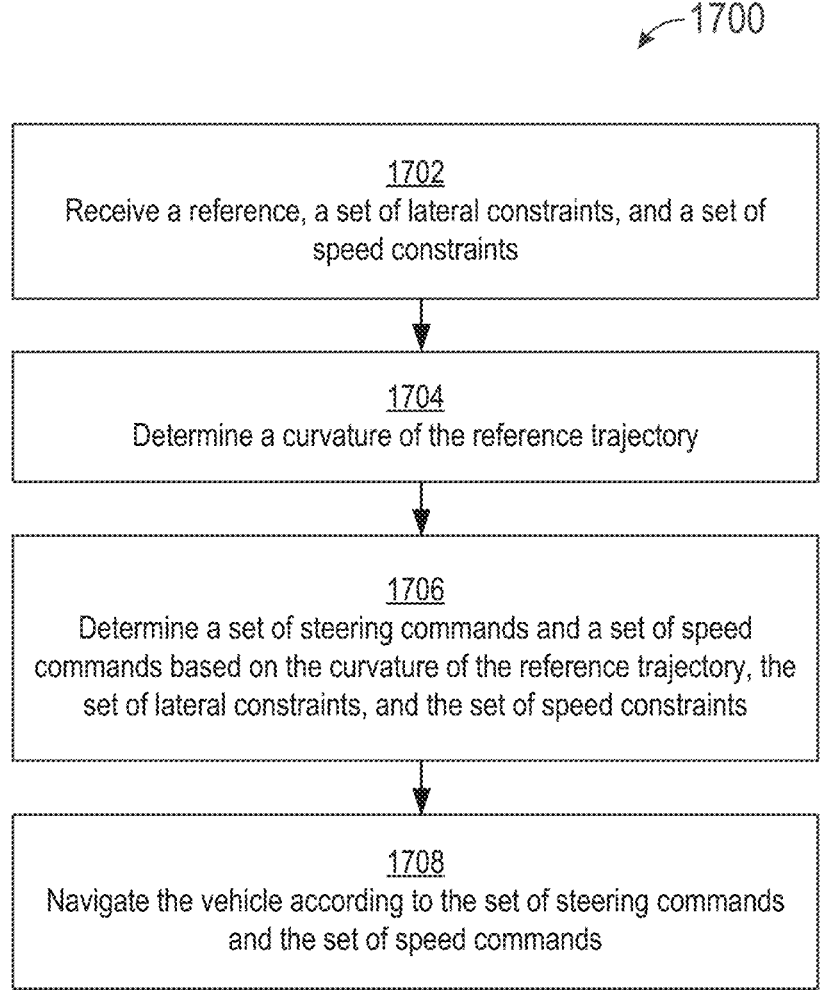
FIG. 17 is a flow chart of an example process for determining steering and speed commands.

FIG. 17 is a flow chart of an example process 1700 for determining steering and speed commands. The process 1700 is described as being performed by a control circuit (e.g., control module 406 of FIG. 4). In some embodiments, the control circuit includes microcontrollers with embedded processing circuits. In some embodiments, process 1700 can be performed by a system of one or more computers located in one or more locations. For example, the AV system 120 of FIG. 1 (or portions thereof), appropriately programmed in accordance with this specification, can perform the process 1700.

At block 1702, while a vehicle (e.g., AV 100) is operating in an autonomous mode (e.g., a fully or highly autonomous mode with automated steering, acceleration, braking, and navigation (e.g., Level 3, 4, or 5)), a control circuit (e.g., control module 406) receives a reference trajectory (e.g., a path with respect to time from planning module 404), a set of lateral constraints (e.g., "tube" constraints—maximum distances to the left and right the vehicle can safely veer from the reference trajectory at different points in time), and a set of speed constraints (e.g., roadway speed limits, physical acceleration/deceleration limits of the vehicle, pre-determined acceleration/deceleration comfort boundaries). In some embodiments, the lateral constraints correspond to lane boundaries. In some embodiments, the lateral constraints are adjusted to avoid obstacles on or near the roadway (e.g., parked cars).

At block 1704, the control circuit determines (e.g., at combined MPC 1420) a curvature of the reference trajectory.

At block 1706, the control circuit determines (e.g., at combined MPC 1420) a set of steering commands and a set of speed commands based on the curvature of the reference trajectory, the set of lateral constraints, and the set of speed constraints. In some embodiments, determining the set of steering commands includes determining a lateral position of the vehicle over time based on a plurality of steering factors, the steering factors including a distance of the vehicle to an obstacle (e.g., a stopped vehicle on the shoulder), a distance of the vehicle from the reference trajectory, and a threshold of lateral change (e.g., maximum allowed rate of turning of vehicle). In some embodiments, the control circuit determines the set of steering commands based at least in part on the determined lateral position of the vehicle over time. In some embodiments, determining the set of speed commands includes determining a target speed of the vehicle over time that satisfies a comfort factor (e.g., an acceleration/deceleration rate is within predetermined acceleration/deceleration comfort boundaries) within the set of speed constraints and determining the set of speed commands based at least in part on the determined target speed of the vehicle over time.

At block 1708, the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands satisfy a safety factor (e.g., an estimated likelihood that the steering and speed commands could result in a collision or dangerous/illegal maneuver is less than a threshold), the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands fail to satisfy a safety factor (e.g., an estimated likelihood that the steering and speed commands could result in a collision or dangerous/illegal maneuver is more than a threshold), the control circuit forgoes navigating the vehicle according to the set of steering commands and the set of speed commands.

Figure 18:
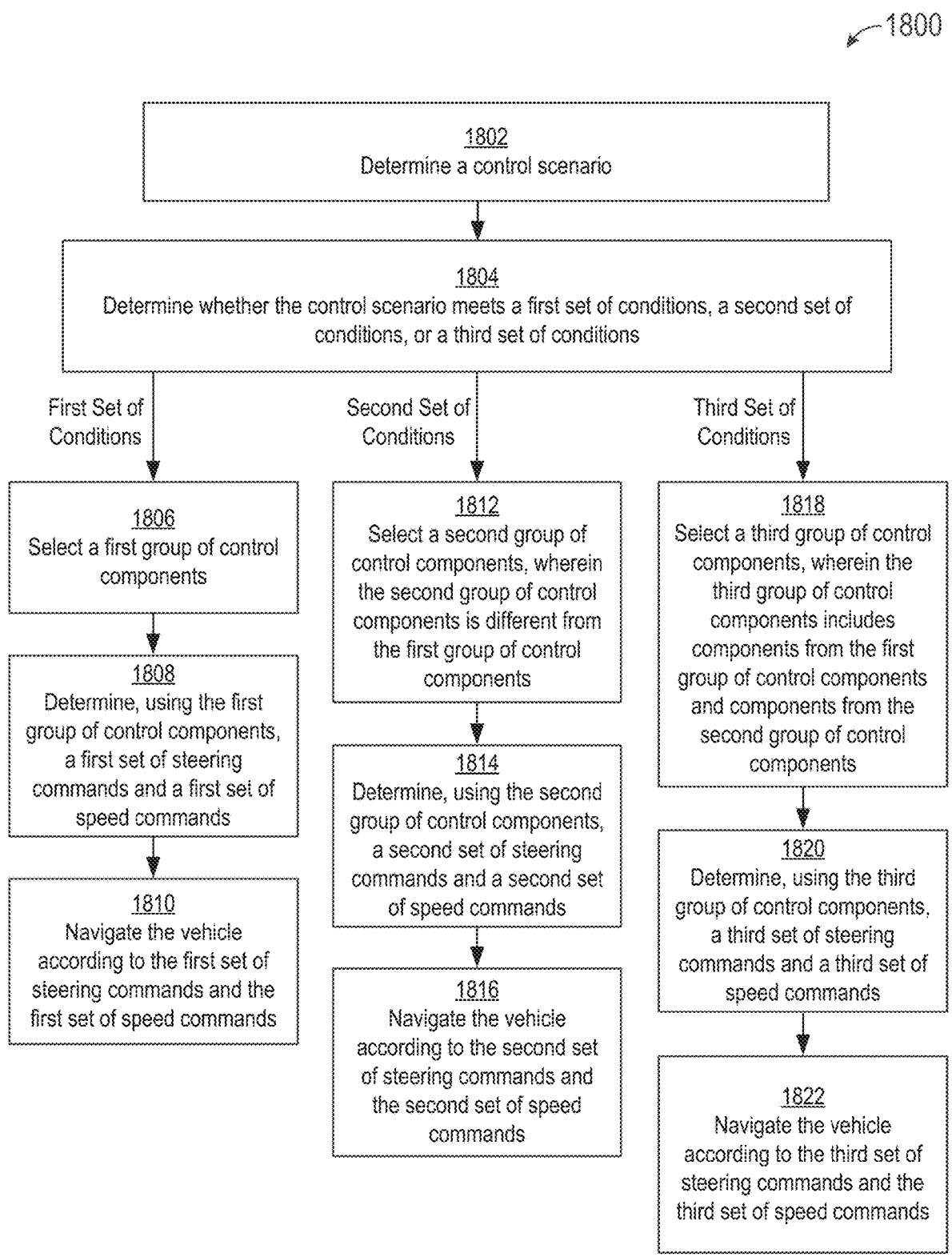
FIG. 18 is a flow chart of an example process for determining steering and speed commands.

FIG. 18 is a flow chart of an example process 1800 for determining steering and speed commands. The process 1800 is described as being performed by a control circuit (e.g., control module 406 of FIG. 4). In some embodiments, the control circuit includes microcontrollers with embedded processing circuits. In some embodiments, process 1800 can be performed by a system of one or more computers located in one or more locations. For example, the AV system 120 of FIG. 1 (or portions thereof), appropriately programmed in accordance with this specification, can perform the process 1800.

At block 1802, a control circuit (e.g., control module 406) determines a control scenario for a vehicle (e.g., AV 100). In some embodiments the control scenario is based on the location of the vehicle (e.g., where the roadway is mapped). In some embodiments the control scenario is based on the capabilities of the vehicle (e.g., processor speed, available sensors). In some embodiments, the control scenario changes dynamically over time (e.g., the current environment where the vehicle is being operated changes). In some embodiments, the control scenario is pre-determined and remains static over time (e.g., the control scenario is determined based on the capabilities of vehicle).

At block 1804, the control circuit determines whether the control scenario meets a first set of conditions, a second set of conditions, or a third set of conditions.

At block 1806, in accordance with a determination that the control scenario meets the first set of conditions (e.g., the vehicle does not have the required capabilities for the combined MPC), the control circuit selects a first group of control components.

At block 1808, the control circuit determines, using the first group of control components, a first set of steering commands and a first set of speed commands. In some embodiments, determining, using the first group of control components, the first set of steering commands and the first set of speed commands includes receiving a reference trajectory (e.g., a path with respect to time from planning module 404), a set of lateral constraints (e.g., "tube" constraints—maximum distances to the left and right the vehicle can safely veer from the reference trajectory at different points in time), and a set of speed constraints (e.g., roadway speed limits, physical acceleration/deceleration limits of the vehicle, predetermined acceleration/deceleration comfort boundaries), determining (e.g., at path optimizer 1406), the first set of steering commands based at least in part on the reference trajectory and the set of lateral constraints (e.g., a set of steering commands that adjust the reference trajectory within the lateral constraints to avoid objects), and determining (e.g., at speed optimizer 1408) the first set of speed commands based at least in part on the set of speed constraints (e.g., a set of speed commands that control the vehicle's speed within the speed constraints). In some embodiments, the lateral constraints correspond to lane boundaries. In some embodiments, the lateral constraints are adjusted to avoid obstacles on or near the roadway (e.g., parked cars). In some embodiments, the first set of speed commands are determined independently from the first set of steering commands (e.g., the speed commands are determined without respect to the steering commands or lateral constraints, and the steering commands are determined without respect to speed commands or speed constraints).

In some embodiments, the first set of steering commands include steering data at a first frequency (e.g., 20 hz). In some embodiments, determining the first set of steering commands includes increasing (e.g., at tracker reference generator 1416), the frequency of the steering data to a second frequency higher than the first frequency (e.g., 100 Hz), determining (e.g., at tracker reference generator 1416) a predicted path based on the steering data at the second frequency, determining (e.g., at tracker reference generator 1416) a reference point of the vehicle along the predicted path based at least in part on a current state of the vehicle (e.g., a point on the predicted path that is nearest to the location of the vehicle), and determining (e.g., at path tracker 1418) the first set of steering commands based at least in part on the reference point of the vehicle. In some embodiments, increasing the frequency of the steering data to the second frequency includes interpolating between discontinuities in the steering data (e.g., abrupt changes in steering are smoothed over). In some embodiments, determining the first set of steering commands based at least in part on the reference point of the vehicle includes determining a lateral error between the current state of the vehicle and the reference point of the vehicle on the predicted path. In some embodiments, the first set of steering commands are determined based on a dynamic bicycle model using the reference point of the vehicle on the predicted path.

In some embodiments, the control circuit receives a speed profile for the predicted path (e.g., a profile including the speeds at which the vehicle is predicted to travel along the predicted path) and determining (e.g., at tracker reference generator 1416) the first set of speed commands based at least in part on the speed profile. In some embodiments, the speed profile includes speed data at the first frequency (e.g., 20 Hz). In some embodiments, determining the first set of speed commands includes increasing (e.g., at tracker reference generator 1416) the frequency of the speed data to a second frequency higher than the first frequency (e.g., 100 Hz).

At block 1810, the control circuit navigates (e.g., at drive-by-wire module 1412) the vehicle according to the first set of steering commands and the first set of speed commands At block 1812, in accordance with a determination that the control scenario meets the second set of conditions, the control circuit selects a second group of control components. The second group of control components is different from the first group of control components.

At block 1814, the control circuit determines, using the second group of control components, a second set of steering commands and a second set of speed commands. In some embodiments, determining, using the second group of control components, the second set of steering commands and the second set of speed commands includes receiving a reference trajectory (e.g., a path with respect to time from a planning module 404), a set of lateral constraints (e.g., "tube" constraints—maximum distances to the left and right the vehicle can safely veer from the reference trajectory at different points in time), and a set of speed constraints (e.g., roadway speed limits, physical acceleration/deceleration limits of the vehicle, predetermined acceleration/deceleration comfort boundaries), determining (e.g., at combined MPC 1420) a curvature of the reference trajectory, and determining (e.g., at combined MPC 1420) the second set of steering commands and second set of speed commands based on the curvature of the reference trajectory, the set of lateral constraints, and the set of speed constraints. In some embodiments, the lateral constraints correspond to lane boundaries. In some embodiments, the lateral constraints are adjusted to avoid obstacles on or near the roadway (e.g., parked cars).

At block 1816, the control circuit navigates (e.g., at drive-by-wire module 1412) the vehicle according to the second set of steering commands and the second set of speed commands.

At block 1818, in accordance with a determination that the control scenario meets the third set of conditions, the control circuit selects a third group of control components. The third group of control components includes components from the first group of control components and components from the second group of control components.

At block 1820, the control circuit determines, using the third group of control components, a third set of steering commands and a third set of speed commands. In some embodiments determining, using the third group of control components, the third set of steering commands and the third set of speed commands includes receiving a reference trajectory (e.g., a path with respect to time from planning module 404), a set of lateral constraints (e.g., "tube" constraints—maximum distances to the left and right the vehicle can safely veer from the reference trajectory at different points in time), and a set of speed constraints (e.g., roadway speed limits, physical acceleration/deceleration limits of the vehicle, predetermined acceleration/deceleration comfort boundaries), determining (e.g., at path optimizer 1406) a fourth set of steering commands based at least in part on the reference trajectory and the set of lateral constraints (e.g., a set of steering commands that adjust the reference trajectory within the lateral constraints to avoid objects), determining (e.g., at speed optimizer 1408) a fourth set of speed commands based at least in part on the set of speed constraints (e.g., a set of speed commands that control the vehicle's speed within the speed constraints), determining (e.g., at combined MPC 1420) a curvature of the reference trajectory, determining (e.g., at combined MPC 1420) a fifth set of steering commands and a fifth set of speed commands based on the curvature of the reference trajectory, the set of lateral constraints, and the set of speed constraints, combining (e.g., at control gateway 1410) the fourth set of steering commands and the fifth set of steering commands to generate the third set of steering commands, and combining (e.g., at control gateway 1410) the fourth set of speed commands and the fifth set of speed commands to generate the third set of steering commands. In some embodiments, the fourth set of speed commands are determined independently from the fourth set of steering commands (e.g., the speed commands are determined without respect to the steering commands or lateral constraints, and the steering commands are determined without respect to speed commands or speed constraints). In some embodiments, the lateral constraints correspond to lane boundaries. In some embodiments, the lateral constraints are adjusted to avoid obstacles on or near the roadway (e.g., parked cars).

At block 1822, the control circuit navigates (e.g., at drive-by-wire module 1412) the vehicle according to the third set of steering commands and the third set of speed commands.

Figure 19:
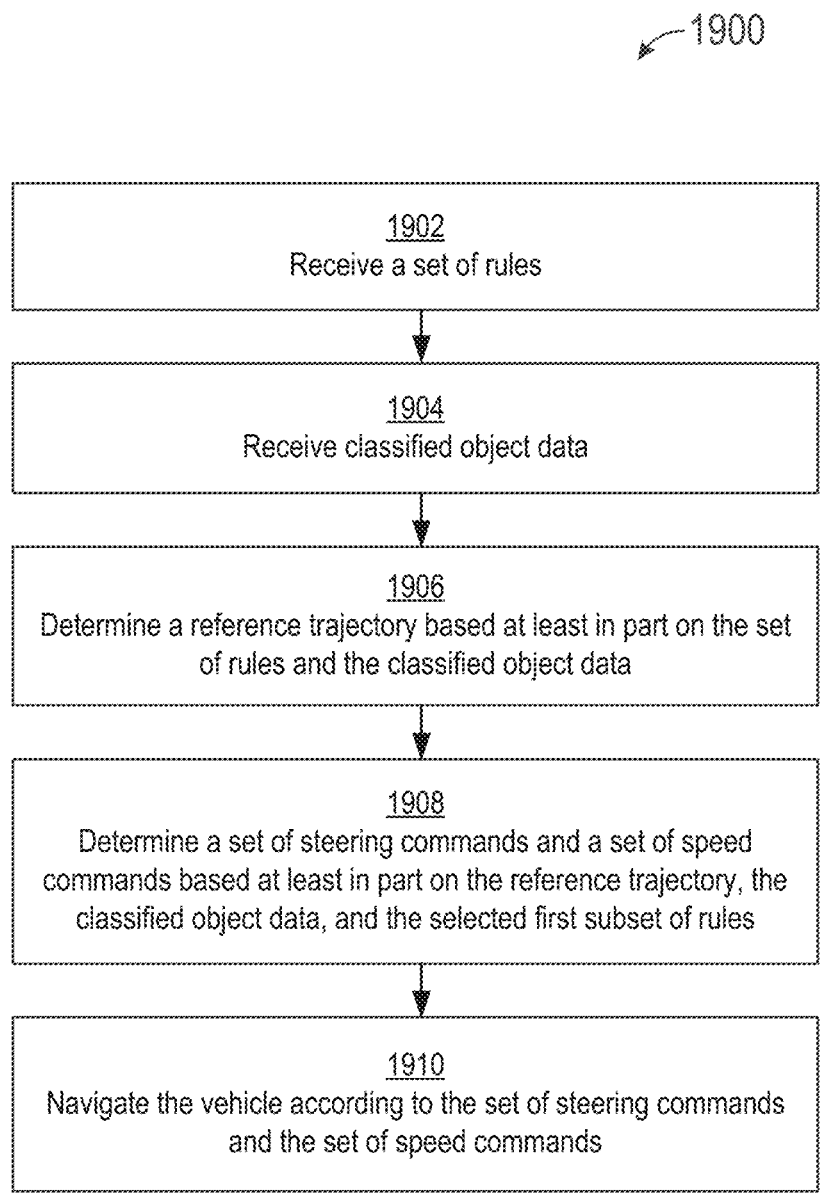
FIG. 19 is a flow chart of an example process for determining steering and speed commands.

FIG. 19 is a flow chart of an example process 1900 for determining steering and speed commands. The process 1900 is described as being performed by a control circuit (e.g., control module 406 of FIG. 4). In some embodiments, the control circuit includes microcontrollers with embedded processing circuits. In some embodiments, process 1900 can be performed by a system of one or more computers located in one or more locations. For example, the AV system 120 of FIG. 1 (or portions thereof), appropriately programmed in accordance with this specification, can perform the process 1900.

At block 1902, while a vehicle (e.g., AV 100) is operating in an autonomous mode (e.g., a fully or highly autonomous mode with automated steering, acceleration, braking, and navigation (e.g., Level 3, 4, or 5)), a control circuit (e.g., control module 406) receives (e.g., at planning module 404 and combined MPC 1420) a set of rules (e.g., from rulebook 1422). The set of rules includes a first subset of rules (e.g., rules used by both the planning module 404 and the combined MPC 1420).

In some embodiments, the set of rules are arranged in a hierarchy of rules (e.g., rules lower in the hierarchy are only checked after rules higher in the hierarchy). In some embodiments, the first subset of rules includes rules associated with continuous values (e.g., the first set of rules use variables that are continuous (e.g., speed, acceleration, distance), whereas some rules in the second set of rules are discrete (e.g., moving or stopped)).

In some embodiments, the first subset of rules includes a proximity rule (e.g., constrains speed and lateral position based on distance to a tracked object, such as another vehicle). In some embodiments, the first subset of rules includes a stay-in-lane rule (e.g., constrains lateral position based on lane boundaries). In some embodiments, the first subset of rules includes one or more constraints on the speed of the vehicle (e.g., maximum speed limit, minimum speed limit, stopping at stop sign). In some embodiments, the first subset of rules includes one or more constraints on the acceleration of the vehicle (e.g., constrain acceleration/deceleration to rates that are within a passenger comfort factor (e.g., avoid hard braking or sudden acceleration)).

At block 1904, the control circuit receives (e.g., at planning module 404 and combined MPC 1420) classified object data (e.g., from perception module 402) (e.g., a detected object that has been grouped into a type, such as pedestrian, bicycle, automobile, traffic sign).

At block 1906, the control circuit determines (e.g., at planning module 404) a reference trajectory based at least in part on the set of rules (e.g., including at least some rules in the set of rules that are not in the first subset of rules) and the classified object data.

At block 1906, the control circuit selects (e.g., at combined MPC 1420) the first subset of rules from the set of rules (e.g., without selecting all the rules in the set of rules from rulebook 1422).

At block 1908, the control circuit determines (e.g., at combined MPC 1420) (e.g., independently from determining the reference trajectory) a set of steering commands and a set of speed commands based at least in part on the reference trajectory, the classified object data, and the selected first subset of rules (e.g., the set of steering commands and the set of speed commands are determined independently from, or without being based on, at least some rules in the set of rules from rulebook 1422).

At block 1910, the control circuit navigates (e.g., at drive-by-wire module 1412) the vehicle according to the set of steering commands and the set of speed commands. In some embodiments, navigating the vehicle according to the set of steering commands and the set of speed commands includes violating at least one rule in the first subset of rules (e.g., AV 100 may come closer to an object than is normally allowed in order to maintain speed).

In some embodiments, in accordance with a determination (e.g., at control gateway 1410) that the set of steering commands and the set of speed commands satisfy a safety factor (e.g., an estimated likelihood that the steering and speed commands could result in a collision or dangerous/illegal maneuver is less than a threshold), the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands fail to satisfy a safety factor (e.g., an estimated likelihood that the steering and speed commands could result in a collision or dangerous/illegal maneuver is more than a threshold), the control circuit forgoes navigating the vehicle according to the set of steering commands and the set of speed commands.

Figure 20:
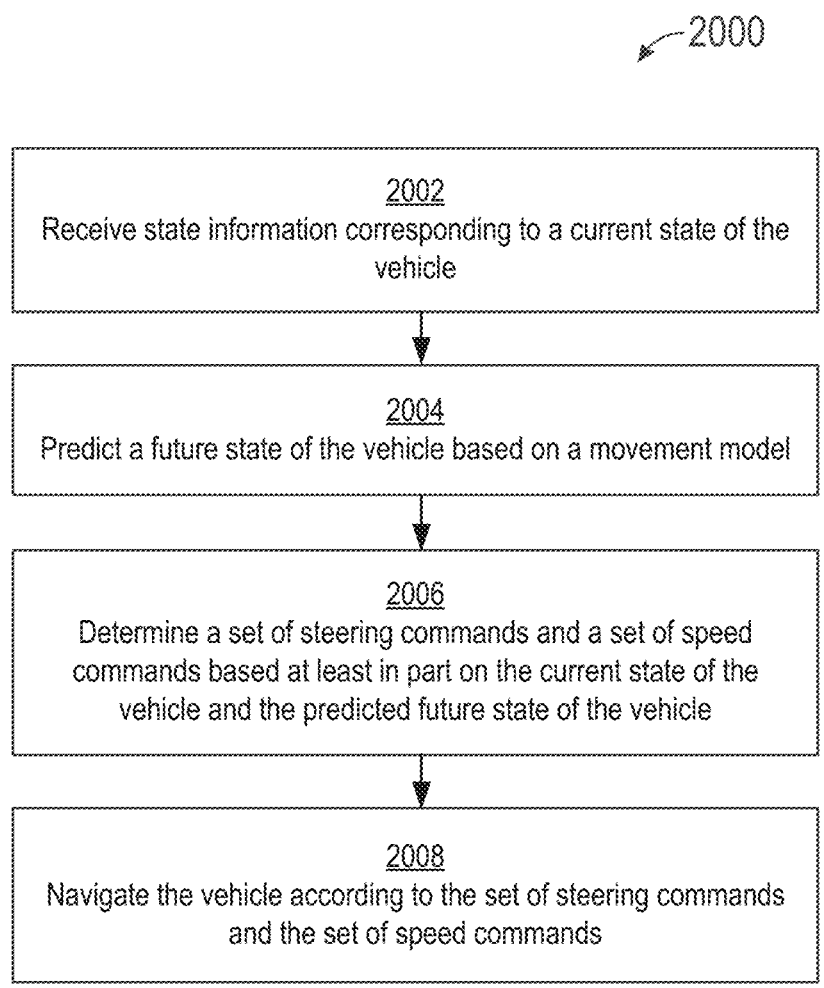
FIG. 20 is a flow chart of an example process for determining steering and speed commands.

FIG. 20 is a flow chart of an example process 2000 for determining steering and speed commands. The process 2000 is described as being performed by a control circuit (e.g., control module 406 of FIG. 4). In some embodiments, the control circuit includes microcontrollers with embedded processing circuits. In some embodiments, process 2000 can be performed by a system of one or more computers located in one or more locations. For example, the AV system 120 of FIG. 1 (or portions thereof), appropriately programmed in accordance with this specification, can perform the process 2000.

At block 2002, while a vehicle (e.g., AV 100) is operating in an autonomous mode (e.g., a fully or highly autonomous mode with automated steering, acceleration, braking, and navigation (e.g., Level 3, 4, or 5)), a control circuit (e.g., control module 406) receives (e.g., at combined MPC 1420) state information corresponding to a current state of the vehicle (e.g., speed, acceleration, steering angle, steering rate, heading).

At block 2004, the control circuit predicts (e.g., at combined MPC 1420) a future state of the vehicle based on a movement model. The movement model includes a dynamic model and a kinematic model (e.g., as described in reference to FIGS. 13D-13E). In some embodiments, the linear dynamic model and the kinematic model are mixed (e.g., using a sigmoid function) based on a current speed of the vehicle. In some embodiments, the movement model uses the low speed kinematic model (e.g., without using the dynamic model) when a current speed of the vehicle is below a first threshold (e.g., 0.5 m/s; the kinematic model is a low speed model) and uses the dynamic model (e.g., without using the low speed kinematic model) when the current speed of the vehicle is above a second threshold (e.g., 2 m/s) different from the first threshold. In some embodiments, the dynamic model is a linear dynamic bicycle model (e.g., as described with reference to FIG. 13D).

At block 2006, the control circuit determines (e.g., at combined MPC 1420) a set of steering commands and a set of speed commands based at least in part on the current state of the vehicle and the predicted future state of the vehicle.

At block 2008, the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands satisfy a safety factor (e.g., an estimated likelihood that the steering and speed commands could result in a collision or dangerous/illegal maneuver is less than a threshold), the control circuit navigates (e.g., at drive-by-wire module 1412) the vehicle according to the set of steering commands and the set of speed commands. In some embodiments, in accordance with a determination (e.g., at control gateway 1410) that the set of steering commands and the set of speed commands fail to satisfy a safety factor (e.g., an estimated likelihood that the steering and speed commands could result in a collision or dangerous/illegal maneuver is more than a threshold), the control circuit forgoes navigating the vehicle according to the set of steering commands and the set of speed commands.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
   one or more computer processors; and
   one or more non-transitory storage media storing instructions which, when executed by the one or more computer processors, cause performance of operations comprising:
   determining, using a control circuit, a control scenario for an autonomous vehicle;
   in accordance with a determination that the control scenario meets a first set of conditions:
     selecting, using the control circuit, the first group of control components;
     determining, using the first group of control components in the control circuit, a first set of steering commands and a first set of speed commands; and
     navigating, using the control circuit, the vehicle according to the first set of steering commands and the first set of speed commands;
   in accordance with a determination that the control scenario meets a second set of conditions:
     selecting, using the control circuit, the second group of control components, wherein the second group of control components is different from the first group of control components;
     determining, using the second group of control components in the control circuit, a second set of steering commands and a second set of speed commands; and
     navigating, using the control circuit, the vehicle according to the second set of steering commands and the second set of speed commands,
   wherein the first set of steering commands include steering data at a first frequency, and wherein determining the first set of steering commands includes:
   increasing, using the control circuit, the frequency of the steering data to a second frequency higher than the first frequency;
   determining, using the control circuit, a predicted path based on the steering data at the second frequency;
   determining, using the control circuit, a reference point of the vehicle along the predicted path based at least in part on a current state of the vehicle; and
   determining, using the control circuit, the first set of steering commands based at least in part on the reference point of the vehicle.

2. The system of claim 1, wherein the control scenario changes dynamically over time.

3. The system of claim 1, wherein the control scenario is pre-determined and remains static over time.

4. The system of claim 1, wherein determining, using the first group of control components in the control circuit, the first set of steering commands and the first set of speed commands includes:
   receiving, using the control circuit, a reference trajectory, a set of lateral constraints, and a set of speed constraints;
   determining, using the control circuit, the first set of steering commands based at least in part on the reference trajectory and the set of lateral constraints; and
   determining, using the control circuit, the first set of speed commands based at least in part on the set of speed constraints.

5. The system of claim 1, wherein increasing the frequency of the steering data to the second frequency includes interpolating between discontinuities in the steering data.

6. The system of claim 1, wherein determining the first set of steering commands based at least in part on the reference point of the vehicle includes determining a lateral error between the current state of the vehicle and the reference point of the vehicle on the predicted path.

7. The system of claim 1, wherein the first set of steering commands are determined based on a dynamic bicycle model using the reference point of the vehicle on the predicted path.

8. The system of claim 1, wherein the instructions further cause performance of operations comprising:
   receiving, using the control circuit, a speed profile for the predicted path; and
   determining, using the control circuit, the first set of speed commands based at least in part on the speed profile.

9. The system of claim 8, wherein the speed profile includes speed data at the first frequency, and wherein determining the first set of speed commands includes increasing, using the control circuit, the frequency of the speed data to a second frequency higher than the first frequency.

10. The system of claim 1, wherein determining, using the second group of control components in the control circuit, the second set of steering commands and the second set of speed commands includes:
    receiving, using a control circuit, a reference trajectory, a set of lateral constraints, and a set of speed constraints;
    determining, using the control circuit, a curvature of the reference trajectory;
    determining, using the control circuit, the second set of steering commands and second set of speed commands based on the curvature of the reference trajectory, the set of lateral constraints, and the set of speed constraints.

11. The system of claim 1, wherein the control circuit includes microcontrollers with embedded processing circuits.

12. The system of claim 1, further comprising:
in accordance with a determination that the control scenario meets a third set of conditions:
  selecting, using the control circuit, a third group of control components, wherein the third group of control components includes components from the first group of control components and components from the second group of control components; and
  determining, using the third group of control components in the control circuit, a third set of steering commands and a third set of speed commands,
wherein determining, using the third group of control components in the control circuit, the third set of steering commands and the third set of speed commands includes:
receiving, using the control circuit, a reference trajectory, a set of lateral constraints, and a set of speed constraints;
determining, using the control circuit, a fourth set of steering commands based at least in part on the reference trajectory and the set of lateral constraints;
determining, using the control circuit, a fourth set of speed commands based at least in part on the set of speed constraints, wherein the fourth set of speed commands are determined independently from the fourth set of steering commands;
determining, using the control circuit, a curvature of the reference trajectory;
determining, using the control circuit, a fifth set of steering commands and a fifth set of speed commands based on the curvature of the reference trajectory, the set of lateral constraints, and the set of speed constraints;
combining, using the control circuit, the fourth set of steering commands and the fifth set of steering commands to generate the third set of steering commands; and
combining, using the control circuit, the fourth set of speed commands and the fifth set of speed commands to generate the third set of steering commands.

13. A method, comprising:
determining, using a control circuit, a control scenario for an autonomous vehicle; in accordance with a determination that the control scenario meets a first set of conditions:
selecting, using the control circuit, a first group of control components;
determining, using the first group of control components in the control circuit, a first set of steering commands and a first set of speed commands; and
navigating, using the control circuit, the vehicle according to the first set of steering commands and the first set of speed commands;
in accordance with a determination that the control scenario meets a second set of conditions:
selecting, using the control circuit, a second group of control components, wherein the second group of control components is different from the first group of control components;
determining, using the second group of control components in the control circuit, a second set of steering commands and a second set of speed commands; and
navigating, using the control circuit, the vehicle according to the second set of steering commands and the second set of speed commands,
wherein the first set of steering commands include steering data at a first frequency, and wherein determining the first set of steering commands includes:
increasing, using the control circuit, the frequency of the steering data to a second frequency higher than the first frequency;
determining, using the control circuit, a predicted path based on the steering data at the second frequency;
determining, using the control circuit, a reference point of the vehicle along the predicted path based at least in part on a current state of the vehicle; and
determining, using the control circuit, the first set of steering commands based at least in part on the reference point of the vehicle.

14. The method of claim 13, wherein the control scenario changes dynamically over time.

15. The method of claim 13, wherein determining, using the first group of control components in the control circuit, the first set of steering commands and the first set of speed commands includes:
receiving, using the control circuit, a reference trajectory, a set of lateral constraints, and a set of speed constraints;
determining, using the control circuit, the first set of steering commands based at least in part on the reference trajectory and the set of lateral constraints; and
determining, using the control circuit, the first set of speed commands based at least in part on the set of speed constraints.

16. The method of claim 13, wherein increasing the frequency of the steering data to the second frequency includes interpolating between discontinuities in the steering data.

17. The method of claim 13, wherein the first set of steering commands are determined based on a dynamic bicycle model using the reference point of the vehicle on the predicted path.

18. A non-transitory computer-readable storage medium storing instructions which, when executed by one or more computer processors, cause performance of operations comprising:
determining, using a control circuit, a control scenario for an autonomous vehicle; in accordance with a determination that the control scenario meets a first set of conditions:
selecting, using the control circuit, a first group of control components;
determining, using the first group of control components in the control circuit, a first set of steering commands and a first set of speed commands; and
navigating, using the control circuit, the vehicle according to the first set of steering commands and the first set of speed commands;
in accordance with a determination that the control scenario meets a second set of conditions:
selecting, using the control circuit, a second group of control components, wherein the second group of control components is different from the first group of control components;
determining, using the second group of control components in the control circuit, a second set of steering commands and a second set of speed commands; and
navigating, using the control circuit, the vehicle according to the second set of steering commands and the second set of speed commands, wherein the first set of steering commands include steering data at a first frequency, and wherein determining the first set of steering commands includes:

increasing, using the control circuit, the frequency of the steering data to a second frequency higher than the first frequency;

determining, using the control circuit, a predicted path based on the steering data at the second frequency;

determining, using the control circuit, a reference point of the vehicle along the predicted path based at least in part on a current state of the vehicle; and determining, using the control circuit, the first set of steering commands based at least in part on the reference point of the vehicle.

* * * * *